(12) United States Patent  
Chatzigianis et al.

(10) Patent No.: US 7,093,232 B1  
(45) Date of Patent: Aug. 15, 2006

(54) COMPONENT STAGER

(75) Inventors: Florence Chatzigianis, San Carlos, CA (US); Yuan Jiang, Fremont, CA (US)

(73) Assignee: Oracle International Corporation (OIC), Redwood Shores, CA (US)

( * ) Notice: Subject to any disclaimer, the term of this patent is extended or adjusted under 35 U.S.C. 154(b) by 595 days.

(21) Appl. No.: 09/982,562

(22) Filed: Oct. 17, 2001

(51) Int. Cl.
G06F 9/44 (2006.01)

(52) U.S. Cl. .................... 717/122; 717/170; 717/172

(58) Field of Classification Search ........ 717/168–178; 707/203–204
See application file for complete search history.

(56) References Cited

U.S. PATENT DOCUMENTS

| | | | | |
|---|---|---|---|---|
| 6,049,671 | A * | 4/2000 | Slivka et al. ................ | 717/173 |
| 6,247,128 | B1 * | 6/2001 | Fisher et al. ................ | 713/100 |
| 6,282,709 | B1 * | 8/2001 | Reha et al. .................. | 717/175 |
| 6,425,126 | B1 * | 7/2002 | Branson et al. ............. | 717/168 |
| 6,442,753 | B1 * | 8/2002 | Gerard et al. ............... | 717/170 |
| 6,493,871 | B1 * | 12/2002 | McGuire et al. ............ | 717/173 |
| 6,675,382 | B1 * | 1/2004 | Foster ........................ | 717/177 |
| 6,681,391 | B1 * | 1/2004 | Marino et al. .............. | 717/175 |
| 6,698,017 | B1 * | 2/2004 | Adamovits et al. ......... | 717/168 |
| 6,782,529 | B1 * | 8/2004 | Kumhyr ..................... | 717/111 |

OTHER PUBLICATIONS van der Hoek et al, "Software Release Mangement",Proceedings of the 6th European Software Engineering Conference, LNCS 1301, Springer Berlin, 1997, pp. 159-175.
"Software Resease Management", http://www.cs.colorado.edu/serl/cm/SRM-long.html, Software Engineering Research Laboratory (SERL), Sep. 21, 1998, 8 pages.
van der Hoek et al, "Software Deployment", *CROSSTALK, The Journal of Defense Software Engineering*, Feb. 1998, pp. 9-13.

* cited by examiner

*Primary Examiner*—Ted T. Vo
(74) *Attorney, Agent, or Firm*—Silicon Valley Patent Group LLP

(57) ABSTRACT

A component stager accepts from developers one or more versions of a component of a product, and associates with each version a time that is one of a number of the periodically recurring times (also called "ticks"), e.g. an upcoming Wednesday, if the periodically recurring times happen on a weekly basis, i.e. every Wednesday. Such associations may be used to identify one or more versions that are associated with a specific tick, e.g. to identify the amount of work done between to ticks and/or to find versions that are currently available for release, which may be based on a most recent tick, or a tick associated with a milestone in the past.

28 Claims, 24 Drawing Sheets

May 2001

| Sunday | Monday | Tuesday | Wednesday | Thursday | Friday | Saturday |
|--------|--------|---------|-----------|----------|--------|----------|
|        |        | 01      | 02        | 03       | 04     | 05       |
| 06     | 07     | 08      | 09        | 10       | 11     | 12       |
| 13     | 14     | 15      | 16        | 17       | 18     | 19       |
| 20     | 21     | 22      | 23<br>23-MAY-01 | 24 | 25     | 26       |
| 27     | 28     | 29      | 30<br>30-MAY-01 | 31 |        |          |

Next

Install BOM

| Tick | Release Name | Top Component | Top Component Version | Subcomponent | Subcomponent Version | Platform |
|---|---|---|---|---|---|---|
| 28-MAR-01 | iAS 2.0.0 | Apache | 20-3-1.3.17.0.1a | oracle.apache | 1.3.17.0.1a | solaris |
| 28-MAR-01 | iAS 2.0.0 | Apache | 20-3-1.3.17.0.1a | oracle.apache.apache | 1.3.17.0.1a | solaris |
| 28-MAR-01 | iAS 2.0.0 | Apache | 20-3-1.3.17.0.1a | oracle.apache.jdk | 1.2.2.0.0a | solaris |
| 28-MAR-01 | iAS 2.0.0 | Apache | 20-3-1.3.17.0.1a | oracle.apache.jsdk | 2.0.0.0.0d | solaris |
| 28-MAR-01 | iAS 2.0.0 | Apache | 20-3-1.3.17.0.1a | oracle.apache.jserv | 1.1.2.0.0a | solaris |
| 28-MAR-01 | iAS 2.0.0 | Apache | 20-3-1.3.17.0.1a | oracle.apache.mod8i | 9.0.0.0.0 | solaris |
| 28-MAR-01 | iAS 2.0.0 | Apache | 20-3-1.3.17.0.1a | oracle.apache.ojk | 1.0.0.0.0a | solaris |
| 28-MAR-01 | iAS 2.0.0 | Apache | 20-3-1.3.17.0.1a | oracle.apache.ojsp | 1.1.0.0.1 | solaris |
| 28-MAR-01 | iAS 2.0.0 | Apache | 20-3-1.3.17.0.1a | oracle.apache.perlint | 5.00503.0.0.0c | solaris |
| 28-MAR-01 | iAS 2.0.0 | Apache | 20-3-1.3.17.0.1a | oracle.apache.xdk | 9.0.0.0.0 | solaris |
| 28-MAR-01 | iAS 2.0.0 | Apache | 20-3-1.3.17.0.1a | oracle.assistants.acf | 2.1.1.0.0 | solaris |
| 28-MAR-01 | iAS 2.0.0 | Apache | 20-3-1.3.17.0.1a | oracle.bali.dbui | 3.3.15.0.0 | solaris |
| 28-MAR-01 | iAS 2.0.0 | Apache | 20-3-1.3.17.0.1a | oracle.bali.ewt | 3.2.5.1.0 | solaris |
| 28-MAR-01 | iAS 2.0.0 | Apache | 20-3-1.3.17.0.1a | oracle.bali.help | 5.0.0.0.0 | solaris |
| 28-MAR-01 | iAS 2.0.0 | Apache | 20-3-1.3.17.0.1a | oracle.bc4j | | solaris |

FIG. 17

FIG. 18 iAS Common Dependency

| Tick | Release Name | Platform | Sub Component | Sub Component Version | Top Component | Top Component Version |
|---|---|---|---|---|---|---|
| 1 28-MAR-01 | iAS 2.0.0 | solaris | bc4jias0 | 3.2.1 | ST_Install_Team_components | 2.0.0.0.0 |
| 2 28-MAR-01 | iAS 2.0.0 | solaris | icache.dummytoplevel | 2.0.0.0.0 | ST_Install_Team_components | 2.0.0.0.0 |
| 3 28-MAR-01 | iAS 2.0.0 | solaris | ibac | 9.0 | ST_Install_Team_components | 2.0.0.0.0 |
| 4 28-MAR-01 | iAS 2.0.0 | solaris | oracle.apache | 1.3.17.0.1a | Apache | 20-3-1.3.17.0.1a |
| 5 28-MAR-01 | iAS 2.0.0 | solaris | oracle.apache | 1.3.12.0.3a | ST_Install_Team_components | 2.0.0.0.0 |
| 6 28-MAR-01 | iAS 2.0.0 | solaris | oracle.apache.apache | 1.3.17.0.1a | Apache | 20-3-1.3.17.0.1a |
| 7 28-MAR-01 | iAS 2.0.0 | solaris | oracle.apache.apache | 1.3.12.0.0a | ST_Install_Team_components | 2.0.0.0.0 |
| 8 28-MAR-01 | iAS 2.0.0 | solaris | oracle.apache.jdk | 1.2.2.0.0a | Apache | 20-3-1.3.17.0.1a |
| 9 28-MAR-01 | iAS 2.0.0 | solaris | oracle.apache.jdk | 1.2.2.0.0a | Forms_Reports | 9.0.0.0.0 |
| 10 28-MAR-01 | iAS 2.0.0 | solaris | oracle.apache.jdk | 1.2.2.0.0a | ST_Install_Team_components | 2.0.0.0.0 |
| 11 28-MAR-01 | iAS 2.0.0 | solaris | oracle.apache.jsdk | 2.0.0.0.0d | Apache | 20-3-1.3.17.0.1a |
| 12 28-MAR-01 | iAS 2.0.0 | solaris | oracle.apache.jsdk | 2.0.0.0.0d | ST_Install_Team_components | 2.0.0.0.0 |

| Stage Date | Stager | Component | Version | Platform | Release Name | Tick | ShipHome | |
|---|---|---|---|---|---|---|---|---|
| 17-NOV-00 | raul.vielma | Discoverer | 3.3.59 | solaris | iAS 2.0.0 | 22-NOV-00 | /net/tools-nfs/cdm/solaris/ias/discoverer/ | |
| 17-NOV-00 | raul.vielma | Discoverer | 3.3.59 | solaris | iAS 2.0.0 | 29-NOV-00 | /net/tools-nfs/cdm/solaris/ias/discoverer/ | |
| 06-DEC-00 | Warren.Briese@oracle.com | Apache | 1.3.12.0.4a | solaris | iAS 2.0.0 | 06-DEC-00 | /net/tools-nfs/cdm/solaris/ias/apache/1.3 | |
| 06-DEC-00 | Warren.Briese@oracle.com | Apache | 1.3.12.0.4a | solaris | iAS 2.0.0 | 13-DEC-00 | /net/tools-nfs/cdm/solaris/ias/apache/1.3 | |
| 12-DEC-00 | miranda.nash@oracle.com | Calypso | Calypso20.001212.M1 | solaris | iAS 2.0.0 | 13-DEC-00 | /net/tools-nfs/cdm/solaris/ias/calypso/cal | |
| 12-DEC-00 | miranda.nash@oracle.com | Calypso | Calypso20.001212.M1 | solaris | iAS 2.0.0 | 20-DEC-00 | /net/tools-nfs/cdm/solaris/ias/calypso/cal | |
| 13-DEC-00 | rmahdlin@us.oracle.com | iFS | 1.1.6.0.0b | solaris | iAS 2.0.0 | 13-DEC-00 | /net/tools-nfs/cdm/solaris/ias/ifs/1.1.6.0.0 | |
| 13-DEC-00 | rmahdlin@us.oracle.com | iFS | 1.1.6.0.0b | solaris | iAS 2.0.0 | 20-DEC-00 | /net/tools-nfs/cdm/solaris/ias/ifs/1.1.6.0.0 | |
| 10-JAN-01 | rvielma@us.oracle.com | Discoverer | 3.3.59.29 | solaris | iAS 2.0.0 | 10-JAN-01 | /net/tools-nfs/cdm/solaris/ias/discoverer/ | |
| 10-JAN-01 | rvielma@us.oracle.com | Discoverer | 3.3.59.29 | solaris | iAS 2.0.0 | 17-JAN-01 | /net/tools-nfs/cdm/solaris/ias/discoverer/ | |

FIG. 21

Show ClearCase Label & Bug Fixes - Netscape

File Edit View Go Communicator Help

Back Forward Reload Home Search Netscape Print Security Shop Stop

Bookmarks Location: http://taji.us.oracle.com/pls/stager30/STAGER101.RPT_CLEARCASELABELSHOW_PARMS Show ClearCase Label & Bug Fixes QUERY
Platform   HP-UX
Release    iTest 2.0.0
Component  ALL
Version    ANY
Type       ALL
Tick       ANY
Content    ANY

[Query] [Cancel]

Team Tao, Oracle IAS

Document: Done

FIG. 22

Show ClearCase Label & Bug Fixes

| Platform | Release | Top Component | Tick | Content | Type |
|---|---|---|---|---|---|
| Hp-Ux | iTest 2.0.0 | iTest 1.0.2.2.3 | May 23, 2001 | test | BugFix |
| Hp-Ux | iTest 2.0.0 | iTest 1.0.2.2.3 | May 23, 2001 | test | ClearCase |
| Hp-Ux | iTest 2.0.0 | iTest 1.0.2.2.3 | May 30, 2001 | test | BugFix |
| Hp-Ux | iTest 2.0.0 | iTest 1.0.9 | Apr 18, 2001 | ANNOTATOR_MAIN_SOLARIS_01038<br>APACHE_9irdbms_SOLARIS_010325<br>ASSISTANTS_9.0.0_SOLARIS_010331<br>BUILDTOOLS_MAIN_SOLARIS_010323<br>BUNDLE_9.0.0.0_SOLARIS_010326<br>BUNDLE_9.0.0_RELEASE_DELTA<br>BUNDLE_9.0.0_TRANSLATION_ENGLISH<br>BYTECODE_MAIN_SOLARIS_010326<br>CSMIG_MAIN_SOLARIS_010327<br>CTX_MAIN_SOLARIS_010329<br>DBJAVA_MAIN_SOLARIS_010323<br>DS_MAIN_SOLARIS_010316<br>ENCRYPTION_9.0.0_SOLARIS_010323<br>INSTALL_MAIN_SOLARIS_010327<br>INSTALL_MAIN_SOLARIS_010327_DELTA<br>ISEARCH_9.0.0_SOLARIS_010326<br>JAVAVM_MAIN_SOLARIS_010325<br>JS_MAIN_SOLARIS_010324<br>JSP_9.0.0_SOLARIS_010324<br>LDAP_3.0.1_SOLARIS_010323<br>LSM_8.1.6_SOLARIS_990202<br>NETWORK_9.0.0_SOLARIS_010323 | ClearCase |

*FIG. 23*

COMPONENT STAGER

BACKGROUND

A software program may be formed of a number of modules. For example, a software program that handles contact information of clients of a business may include the following modules: a mail tool, an address book and a calendar. Such modules may be produced separate from one another, individually tested, and then compiled and linked together to produce a single software program (also called "executable image").

Software manufacturers often produce such a software program by modifying a prior version of the software program. To identify a current version from a prior version, such software programs are commonly given a name and a version number, e.g. Oracle 9i. Versions of individual modules of such a software program may be internally tracked by the software manufacturer using a version control system such as ClearCase by Rational Software of Lexington, Mass. (see www.rational.com).

A given version of software may be made available to users using a software release manager as described in an article entitled "Software Release Management" by Andr'e van der Hoek, Richard S. Hall, Dennis Heimbigner, and Alexander L. Wolf, Proceedings of the 6th European Software Engineering Conference, LNCS 1301, Springer, Berlin, 1997, which is incorporated by reference herein in its entirety.

Another article entitled "Software Release Management" available at www.cs.colorado.edu/serl/cm/SRM-long.html (which is also incorporated herein by reference in its entirety) describes an interface for a software release manager (abbreviated as SRM) to which a developer supplies information, such as the program name, the release number, release date, etc. In addition, the developer supplies the name of an archive file where the release is stored. After software has been released to SRM, it can be retrieved by a consumer using another part of SRM.

SRM allows a consumer to gain insight using a dependence-graph which can be obtained via a "Show Dependency Graph" button. For example, one may see that a release 2.0 of ProDag depends on release 3.1 of LPT, release 3.3 of Q, and release 2.0 of TAOS. However, these three dependencies were indicated by the developer, namely that ProDAG depends on release 3.1 of LPT, release 3.3 of Q, and release 2.0 of TAOS. In addition, one may see that ProDAG transitively depends on release 403.2 of Arpc, since release 3.3 of Q depends on that.

SUMMARY

A method and apparatus (also called "component stager") in accordance with the invention accept from users (also called "developers") one or more versions of a component of a product (or alternatively identities of such versions), and associate with each version a time that is selected from a number of the periodically recurring times, e.g. an upcoming Wednesday, if the periodically recurring times happen on a weekly basis, i.e. every Wednesday. In one embodiment, the apparatus and method identify a version for release to other users (such as product integrators and/or testers), using the just-described association, and a time that occurred most recently in the past from among the periodically recurring times, e.g. last Wednesday. In other embodiments, such associations may be used for other purposes, which may or may not be related to release of a version.

BRIEF DESCRIPTION OF THE DRAWINGS

FIGS. 5–25 illustrate a graphical user interface for one implementation of the system of FIG. 3.

DETAILED DESCRIPTION

An apparatus and method in one embodiment perform method 10 (FIG. 1) to manage the release of a product that has a number of components, with each component having a number of versions. The product can be, for example, software such as the database Oracle 8i available from Oracle Corporation, or alternatively can be any other product, such as an automobile that has a multiplicity of components and a multiplicity of versions. Specifically, in method 10, an association is stored in memory, identifying a version of a component, and a time that is one of a number of periodically recurring times. Such a time can be, e.g. the beginning of upcoming Wednesday (e.g. immediately after midnight on Tuesday) if the periodically recurring times occur at the beginning of Wednesdays. In such an example, assume today is Monday.

The periodically recurring times are also called "ticks", and each version of each component is associated with a tick. The periodicity of the ticks can be a commonly used time period, e.g. a week, a month, a day, or an hour. However, in alternative embodiments, the periodicity of ticks can be set to any arbitrarily defined period, e.g. ticks can occur every ten days, or every two hours.

Figure 2:
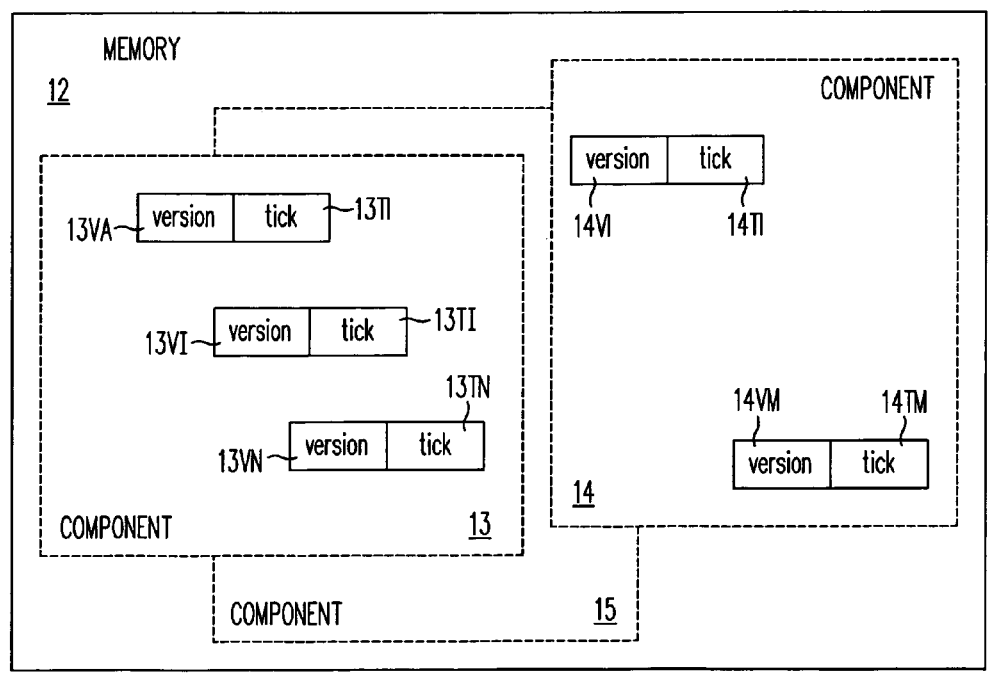
FIG. 2 illustrates, in a block diagram, an association between each version to be released and a time after which the version may be released (also called "tick"), which association is formed as illustrated by act 11 in FIG. 1.

Therefore, a memory 12 of the apparatus may contain the identities of a number of versions 13VA–13VN (wherein A=I=N, with N indicating the number of such versions), and may also contain a corresponding number of ticks 13TI–13TN. In one embodiment, each identifier 13VI of a version of component 13 is associated with a corresponding tick 13TI as shown in FIG. 2 as being stored adjacent to the identifier, although in other embodiments a version identifier and its associated tick may be related to each other, e.g. via a pointer, and therefore need not be stored adjacent to one another. Any number of such indirections may be present or not present (e.g. software for a version and its associated tick may be stored in the same file).

Figure 1:
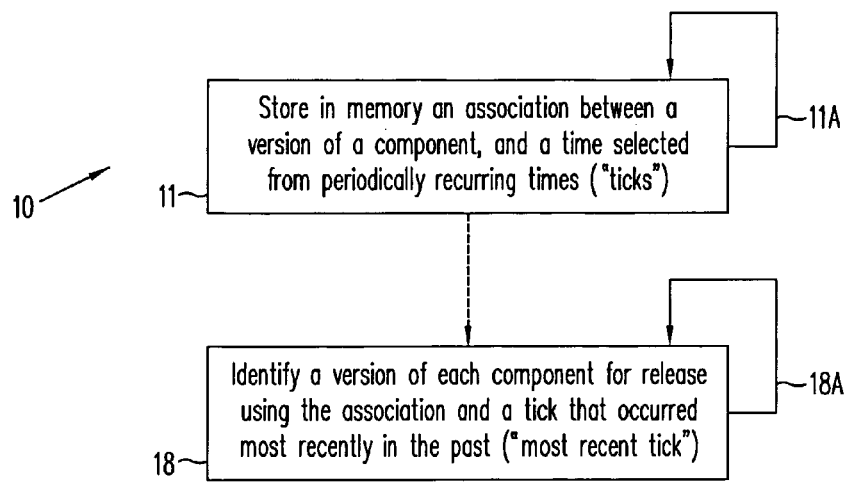
FIG. 1 illustrates, in a flowchart, acts performed by a method and apparatus in accordance with the invention.

Regardless of how the association is represented in memory 12, such an association permits the identification of a version based on its associated tick. Specifically, as illustrated in FIG. 1, in act 18, method 10 requires that the version of each component that is to be released must be identified based on a tick that occurred most recently in the past (also called "most recent tick"). For example, if at current time tick 13TI occurred most recently, and if tick 13T1 is yet to occur, and if tick 13TN is an older tick, the method identifies version 13VI as the version being released currently.

In one embodiment, components are identified by the following attributes, which together uniquely identify each component: name, version and platform (operating system). Components are staged to a single common area using the component stager, and each component is staged against a chosen "tick" date. Some tick dates are associated with a date known as a "release milestone", and this association is defined through an administration function of the component stager, by those individuals in charge of release management for the integrated product. At each release milestone, all components associated with the tick mapped to the release milestone are integrated together into a single product or release.

Note that, ticks can be given any meaning that is relevant to the development process that the component stager is serving. In one embodiment described herein, release milestones are relevant to the development of an integrated product, and for this reason it is the release milestones that are mapped to ticks. However, the component stager could be used to integrate together any component-based system. For example, the component stager could be used to construct a complete classroom curriculum. In this example, assume a curriculum is made up of a number of classes each with its set of pre-requisites.

In such a model, ticks may be associated with class groupings: beginning, intermediate (which depends on beginning), and advanced (which depends on intermediate). All students who complete their beginning courses by a tick (called "beginning tick") may be required to complete their intermediate courses by another tick (that has a fixed relation to the beginning tick), and so on. The meaning and goals for each tick are set not by the Stager tool itself, but by the release or project manager who uses it. So a project manager for a classroom scheduling operation may define a tick to be when a course needs to be completed.

Therefore, ticks of the type described herein can be mapped to any component-based projects, depending on the embodiment. A component stager as described herein need not impose a mapping, and instead may allow an administrator of the system to define the meaning and timing of an event which is mapped to a tick.

Acts 11 and 18 may be repeated as often as necessary, and may be performed independent of one another. For example, a number of developers (or even a single developer) may repeatedly perform act 11 (as illustrated by branch 11A) to form associations between multiple versions of multiple components (such as components 13, 14 and 15 illustrated in FIG. 2) and the respective ticks that are to be used in identifying the components for release. Moreover, act 18 may be repeatedly performed as illustrated by branch 18A by, for example, a product integrator that needs to integrate the three components 13, 14 and 15, to identify the versions that are available for release, based on the most recent tick as illustrated by act 18A When forming an association between a version of a component and a tick (also called "staging"), a developer may identify a tick that is yet to occur. Typically, the developer identifies the next upcoming tick, and such identification may even be performed automatically depending on the embodiment. If a developer does not wish a specific version to be available for release until some particular tick in the future, the developer may specify that particular tick (which may be, for example, three ticks away from the upcoming tick). If the identification of a tick is performed automatically in an embodiment, the automatic procedure must be bypassed to manually specify three ticks away.

Moreover, a developer may decide to associate a version with a tick that has already occurred, e.g. the most recent tick, if the version should have been available for release with the most recent tick, e.g. due to a milestone. In such a case, the developer may be required follow a special procedure called "exception" as discussed below in one specific implementation. That is, if a developer misses the deadline or tick date for staging a component into a release, the developer can still stage against an earlier past tick, if the developer performs exception staging. Such exception staging may require approval before the belated component is recorded into the past tick list of component contents.

In an alternative embodiment, such a special procedure is not followed by the developer, and instead a computer that stores the association in memory 12 may be programmed to automatically notify a product integrator that a version has been associated with a tick in the past so that the integrator may perform the appropriate activity, e.g. update their build based on the newly-associated version.

Act 18 (FIG. 1) can be performed at any time relative to the periodically recurring times, depending on the embodiment. In one embodiment, act 18 is performed at certain predetermined ticks that are related to certain milestones in the development of the product, for example alpha release or beta release or production release. Act 18 may also be performed at intermediate ticks between such predetermined ticks, depending on testing schedule, bugs found during testing and bug fixes that have been implemented by certain versions to overcome such bugs.

In another embodiment, act 18 is automatically performed after each tick followed by an automatic build, e.g. within a predetermined time period after each tick. In such an embodiment, a version of the product containing the most recently released component versions is automatically available in a predetermined region of memory, at all time (except during the predetermined time, because the available product version does not contain the most recently released component versions). In yet another embodiment, act 18 is performed on demand, whenever a product integrator needs to prepare a build. One or more of the just-described embodiments may be combined with one another in performance of act 18, and/or act 11, depending on the embodiment.

Memory 12 can be any kind of memory, e.g. dynamic random access memory (DRAM), or other dynamic storage device, or alternatively can be a magnetic medium such as a floppy disk, a flexible disk, a hard disk, a magnetic tape or any kind of optical medium, such as a CD-ROM or any other physical medium for storing information. Moreover, any of the just-described types of memories can be combined with one another to form memory 12. Furthermore, memory 12 need not be in a centralized location and instead may be distributed among a number of computers that are geographically separated from one another and coupled together by a network, such as a local area network or a wide area network. Moreover, acts 11 and 18 of method 10 may be performed either by a single processor, or by multiple processors of a single computer, or by multiple computers that are separated from one another as just-described.

In one embodiment, a computer 20 (FIG. 3) includes a processor 20P that performs that each of acts 11 and 18. Processor 20P is coupled to a main memory 20M and disk 20D that together implement memory 12 (FIG. 2). As would be apparent to the skilled artisan, computer 20 may also include a number of other components (not shown in FIG.

3), such as a cathode ray tube (CRT) for displaying information to a user, an input device such as an alphanumeric keyboard, and a pointing device, such as a mouse or a trackball. Computer 20 also includes a component to implement a link to a computer network, e.g. a network card that provides a connection to a local area network, or alternatively a modem that provides a connection to Internet Service Provider (ISP) via such a network.

Computer 20 (also called "stager") is coupled to one or more computers 21A–21P that are to be used by developers to identify the tick and the version of a component, prior to release. Similarly, computer 20 is also coupled to another computer 22 that uses the components available for release, for example integrates the components to form a product for testing and manufacturing.

In the one specific implementation of this embodiment, the product consists of software, and each of computers 21A–21P provides one or more versions of each of the components of the software product, in addition to identifying the version and the tick to be associated with the version. Also in this implementation, the software product is generated by computer 22 from the currently released versions of each of the components included in the software product.

Figure 3:
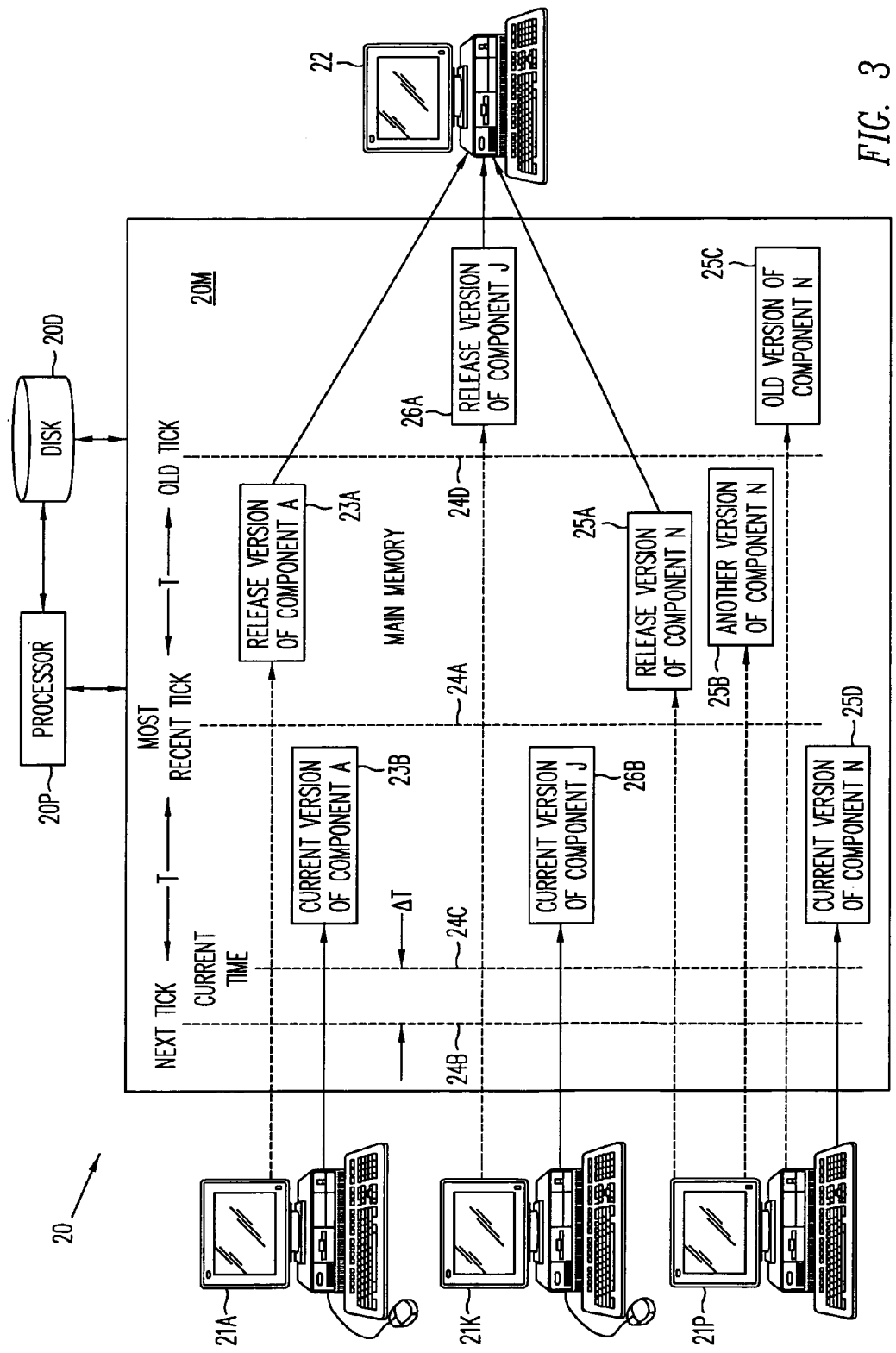
FIG. 3 illustrates, in a block diagram, an apparatus that performs the method of FIG. 1 using the memory of FIG. 2 to transfer versions between developers and other users, such as a product integrator.

In one example illustrated in FIG. 3, a developer has used a computer 21A to provide to stager 20 two versions of a component A, namely version 23A that is associated with a tick 24A (illustrated by a dashed vertical line), and another version 23B that is associated with a tick 24B. In this example, at a current time 24C, tick 24A has already occurred and is the most recent tick, whereas tick 24B is yet to occur and is the next upcoming tick. Therefore, in response to a request from computer 22, when stager 20 identifies the version to be released, stager 20 selects version 23A to be released. Version 23B, although present in the memory 20M, is not available for release until after passage of a time ΔT between current time 24C and the next tick 24B.

In FIG. 3, the vertical-dashed lines, e.g. lines 24A–24B are merely illustrative of the passage of time, and may or may not be related to the physical organization of memory 20M. Specifically, versions 23A and 23B need not be present in certain predetermined regions of the memory in order to implement such an embodiment. Although, in another embodiment, all of the versions associated with a specific tick may be kept in a certain physical memory region, such as a separate directory. For example, the versions 23A, 25A and 25B that are associated with the most recent tick 24A may all be physically placed into a single directory, for ease of access by computer 22 when performing integration.

In another example, a component J does not have any version that has been associated with most recent tick 24A (e.g. last Wednesday) by a developer. Instead, the developer has only provided a version 26A that was associated with an old tick 24D (e.g. a Wednesday two weeks ago). In such a case, on performance of act 18, stager 20 identifies version 26A as being available for release as soon as old tick 24D occurred, and thereafter also continues to identify version 26A until a new version is received and is available for release. In this example, the developer has provided another version 26B recently, after the most recent tick 24A, but this version is associated with a next tick 24B (e.g. next Wednesday). Therefore, no version is associated with most recent tick 24A by the developer. For this reason, stager 20 will continue to identify version 26A as being available for release, until the next tick 24B occurs at which time version 26B is identified.

In yet another example, a developer provides two versions of a component N, namely version 25A and version 25B both of which are associated by the developer with the most recent tick 24A. In such a case, stager 20 identifies only one of the several versions associated with most recent tick 24A, depending on a predetermined criterion. In one specific implementation, the predetermined criterion is to use the most recently associated version. If this predetermined criterion is used, version 25A is identified in act 18 if version 25A was associated after the association of version 25B.

Alternatively, another predetermined criterion could be identification of a version that has the highest version number among the versions that are all associated with the most recent tick, e.g. version 25A may be identified if it has a higher version number than version 25B regardless of when the associations were formed between these versions and most recent tick 24A. In such an implementation, stager 20 may ensure, at the time of association formation, that the version number of a to-be-formed association is higher than the version number of the most recently formed association. Depending on the embodiment, stager 20 may automatically determine the version number, e.g. by incrementing from a previous number. If the version number contains multiple fields, the version number to be used for a version may be determined automatically based also on the relation between the tick to be associated with the version and a milestone.

As illustrated in FIG. 3, in the just-described example, there may be other versions of component N, namely versions 25C and 25D that are respectively associated with their ticks 24D and 24B, which happen to be an old tick and a next tick. In this manner, use of ticks as described herein permits stager 20 to identify an appropriate version 25A of a component N for release, regardless of the number of versions 25B–25D that may have been identified as being available for release.

Figure 4:
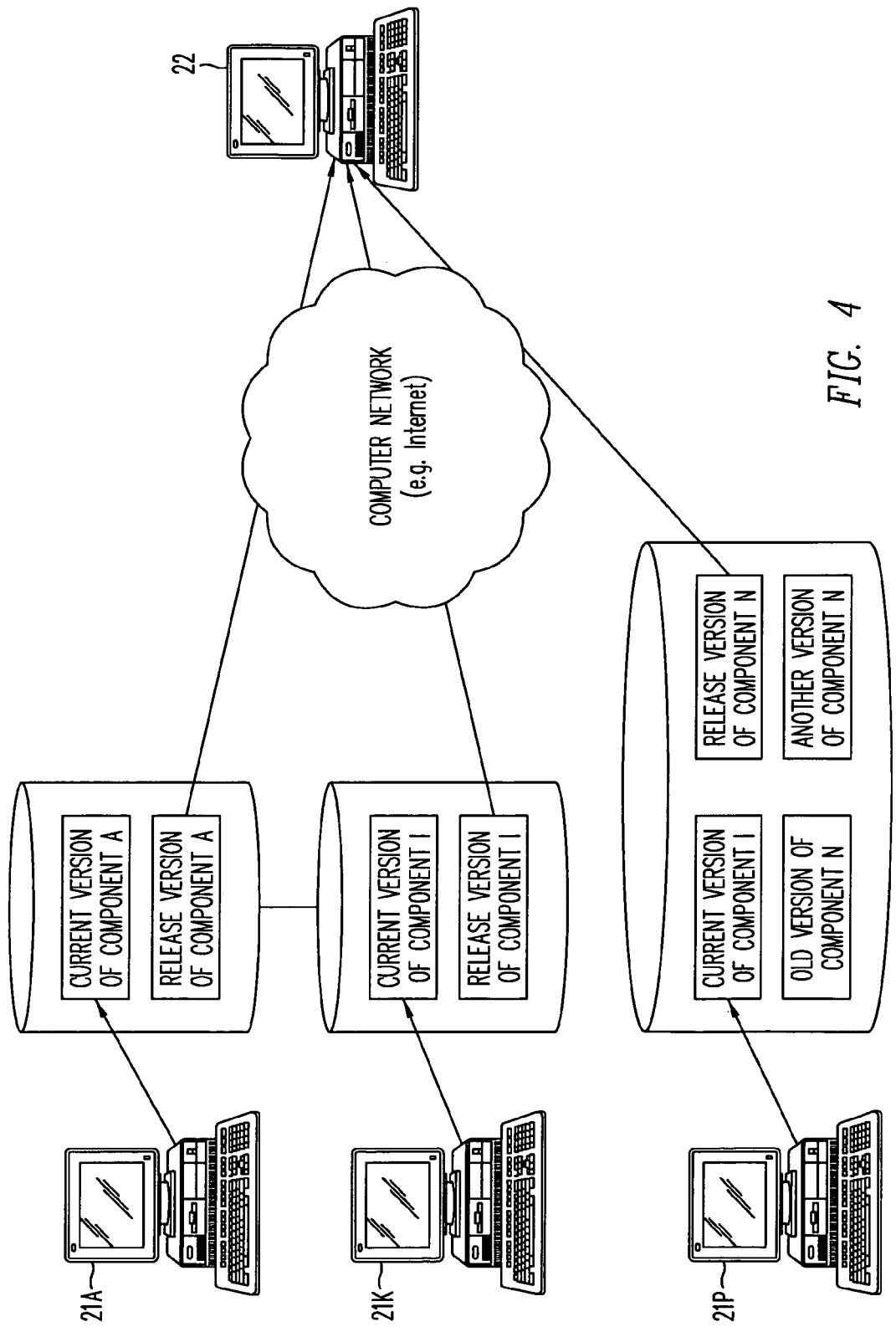
FIG. 4 illustrates, in a block diagram, an alternative embodiment that does not have a centralized apparatus (also called "component stager") of the type illustrated in FIG. 3, and instead performs act 11 of FIG. 1 in a distributed manner, in each of computers 21A–21P.

In the above-described embodiment, all of the versions were being maintained in the same apparatus, namely stager 20, although in another embodiment (FIG. 4) each of computers 21A–21P may itself maintain all of the versions of the locally in its own respective hard disk and also maintain the respective associations with ticks. In such an alternative embodiment, computer 22 is coupled to such disks via a computer network, and performs act 18 (FIG. 1) and copies the version of each component that is currently available for release regardless of the number of versions that may be present in the disks.

In yet another alternative embodiment, computers 21A–21P automatically perform act 18 at the end of each tick, and simply copy the appropriate versions to a predetermined directory in computer 22. In such an embodiment, computer 22 may be programmed to automatically perform a build of such versions.

Use of ticks i.e. periodically recurring times as described herein eliminates the need for members of a development team that develop multiple versions of various components of a product (or system) to directly communicate with members of an integration team each time a version of a component is available for release. Therefore, the amount of email and voicemail communication for identifying various versions of various components becoming available for release at various times is eliminated or reduced. Instead, each member of the development team simply relies on the occurrence of a tick to identify a component version that is available for release. For example, if ticks are occurring every Wednesday, many members of the development team may decide on Tuesday evening to make available their current version at the next tick which is the next day. Other developers may select a future tick, a Wednesday three weeks from now if the changes that have been made are not to be used during the three-week timeframe. For example, the changes may relate to a new feature that is to be made available after a milestone that occurs in two weeks.

Occurrence of a tick more frequently than a milestone (when all of the components need to be released), eliminate the need for the developer to remember when the next milestone occurs. Instead, the developer simply relies on the occurrence of a tick every Wednesday to make available their component for release at the next tick (i.e. the next Wednesday). Such reliance over a number of ticks results in each developer forming a habit and automatically staging their version (e.g. every Tuesday).

In one embodiment, a tick is not a mandatory staging date, but a staging opportunity. Developers can and should stage their components at any time, whenever their components are ready for consumption. So the fact that the system administrator has set up a tick as occurring every Wednesday does not mean that stages have to be performed on Wednesdays. In practice, however, developers tend to wait until the final hour of a tick date to stage, and developers find it very helpful to have a consistent tick day within the week.

Furthermore, use of the above-described tick eliminates the need for a developer to wait until a milestone, to release the current version of their component. The developer may release any number of versions that are all associated with the same tick, in case the developer makes a number of changes between two ticks. All such changes are easily tracked, if necessary, based on the version number. Furthermore, association of each version with a tick after which the version is to be made available for release as described above has the advantage of not requiring each developer to keep track of any changes in the schedule of a milestone.

So it is easy for a milestone to be moved into the future without informing developers (except for developers who have staged to a future tick after a milestone). Specifically, a milestone can be moved forward into the future and this will be visible to developers through the user interface of the component stager (e.g. the component stager will show that upcoming Milestone5 now is associated with a tick date of May 23 when it was previously May 16) and developers need not perform any action to see such changes (other than staging their component).

In one embodiment, the just-described identification of release 26A after occurrence of tick 24A is performed by processor 20P looking for a version associated with the most recent tick 24A, and when not found looking for a version associated with the next most recent tick 24D and repeating this process as often as necessary until the version is found. In this example, a version is found associated with a tick 24D, although in other examples, processor 20P may have to step back through a number of such ticks. In an alternative embodiment, on the passage of each tick, an association is automatically formed between a version that is currently associated with the most recent tick and the next upcoming tick, so that the version becomes available on passage of the next tick. Therefore, in such an alternative embodiment, version 26A is initially associated with old tick 24D by the developer, and is thereafter automatically associated with most recent tick 24A, followed by another automatic association with next tick 24B. Such automatic associations may be done indefinitely (e.g. on each tick), until the developer provides a new version.

Regardless of how the associations are formed, the associations may be stored in a flat file, or alternatively in a database, such as a relational database available from Oracle Corporation of Redwood City, Calif. Moreover, such a database may also hold other information, such as the identity of developer (i.e. a person responsible for development) of the version being associated, an address of the version (e.g. a uniform resource locator abbreviated as URL, an identity of a bug that has been fixed in the version, a label of the component used in a version control system, such as ClearCase by Rational Software, a time (also called "staging time") when the association is formed, an identifier of a release (such as "Beta", "Alpha", "production"), and/or a version number that uniquely identifies the version being associated. One or more of the just-described types of information may be maintained with the association described above, depending on the embodiment. Moreover, such information may be obtained from a person, through a graphical user interface, or may be obtained automatically.

The information or associations mentioned above (e.g. component name, version, platform, developer name, bugs fixed, clearcase labels etc) are part of various fields that the developer has to fill out in order to stage their component, and are recorded (e.g. in a database) automatically (i.e. without further input from the developer).

Figure 5:
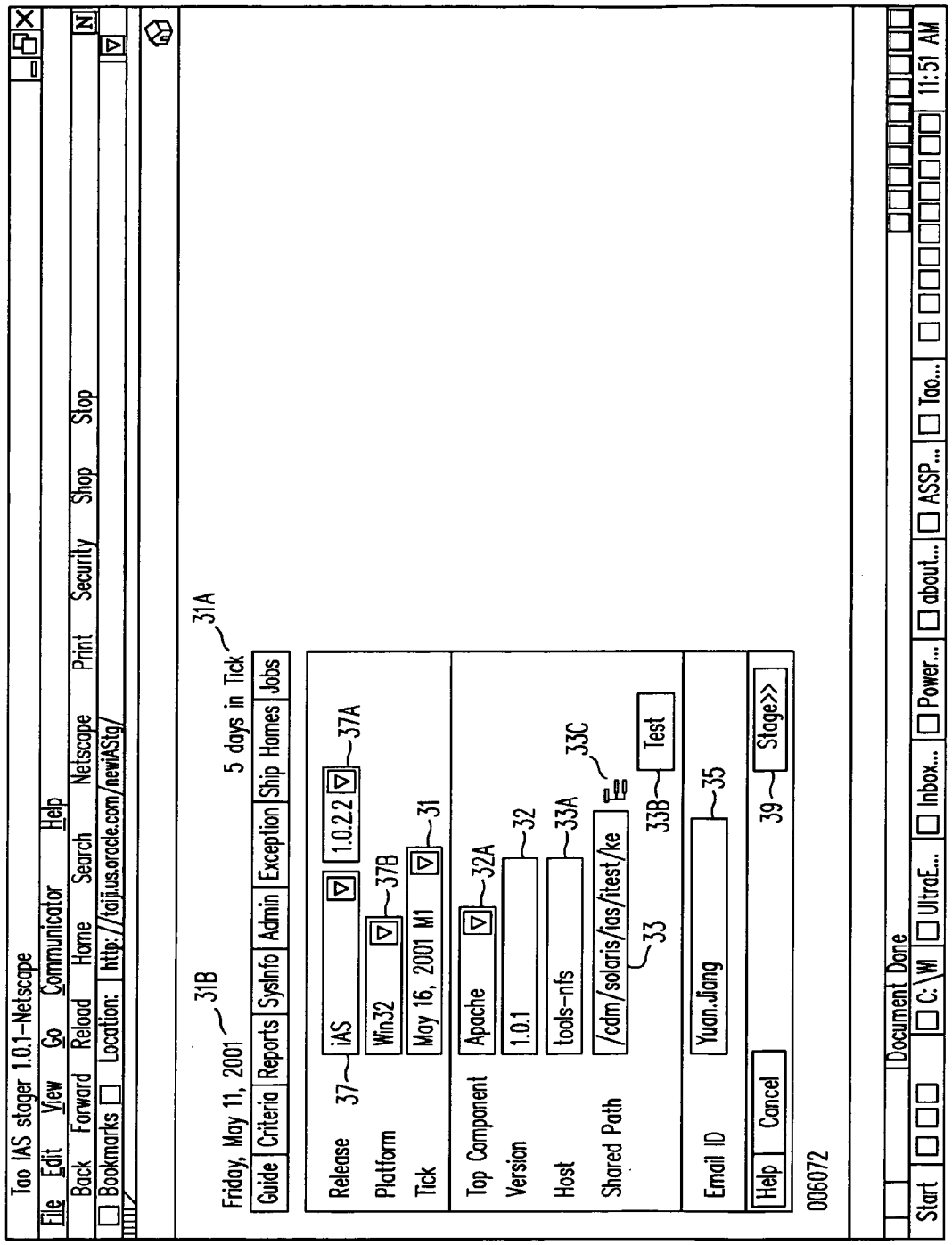

One example of an implementation of the type described above uses a graphical user interface having a screen 30 as illustrated in FIG. 5 to elicit information about a version of a component, and a tick that are to be associated with one another as described above. The graphical user interface may be implemented in each of computers 21A–21P (FIGS. 3 and 4) that are used by developers. In one example, the graphical user interface also elicits additional information that is maintained with the association, to provide additional functionality (such as reports) as described below. The graphical user interface can be implemented in any manner well known in the art, e.g. as web pages displayed by a web browser such as the Netscape browser, or alternatively in Microsoft Visual Basic, or in Tcl/Tk.

In the example illustrated in FIG. 5, a screen 30 of one such graphical user interface displays a number of controls, which can be, for example, a drop-down list box, a spinner, a text entry box, or any other control for communicating with a human and well known to a person skilled in the art of designing graphical user interfaces. Screen 30 also displays messages in fields (e.g. fields 31A and 31B) that cannot be changed by a user.

In control 31, the graphical user interface requires the user to identify a tick with which a version identified in control 32 is to be associated. In this example, control 32 requires a developer to identify three parts, a first part that indicates a major revision, a second part that indicates a minor revision, and a third part which indicates a bug fix. Depending on the example and the implementation, the version number in control 32 can have different structures, which can be, for example, only two parts or only one part or any number of parts, and each part can be either an integer or even an alpha numeric code. The graphical user interface also requires the developer to identify the name of the component in control 32A, although such a name may be included in version control 32A in other implementations. The tick to be identified in control 31 may be selected by the developer from a set of upcoming ticks which may be displayed in a drop down list box, e.g. two ticks namely the upcoming Wednesday and another Wednesday a week from the upcoming Wednesday may be displayed.

If a milestone is associated with a tick, such a milestone may also be displayed in screen 30, e.g. in control 31 as illustrated in FIG. 5 wherein the milestone is listed as "M1" appended to the date May 16, 2001. In addition, screen 30 may also display the amount of time left up to the tick date, e.g. in field 31A of FIG. 5, a message "5 days in Tick" is displayed. The duration shown in field 31A, namely five days, is computed as the difference between the current date shown in field 31B, which is shown as "Friday, May 11, 2001" and the upcoming tick date for "May 16, 2001" in control 31. If the user changes the tick date in control 31, the message field 31A is automatically updated to show the number of days for which the current version will not be available for release.

In the example illustrated in FIG. 5, the user also provides in control 33 the identity of a path where the version located. If the path control 33 does not include the name of a host, the host name may be provided in another control 33A. Screen 30 illustrated in FIG. 5 also allows a user to have the path specified in control 33 to be checked for accessibility so that the to-be-released version identified in control 32 is can be copied, by selecting a button 33B which is labeled "Test".

Figure 24:
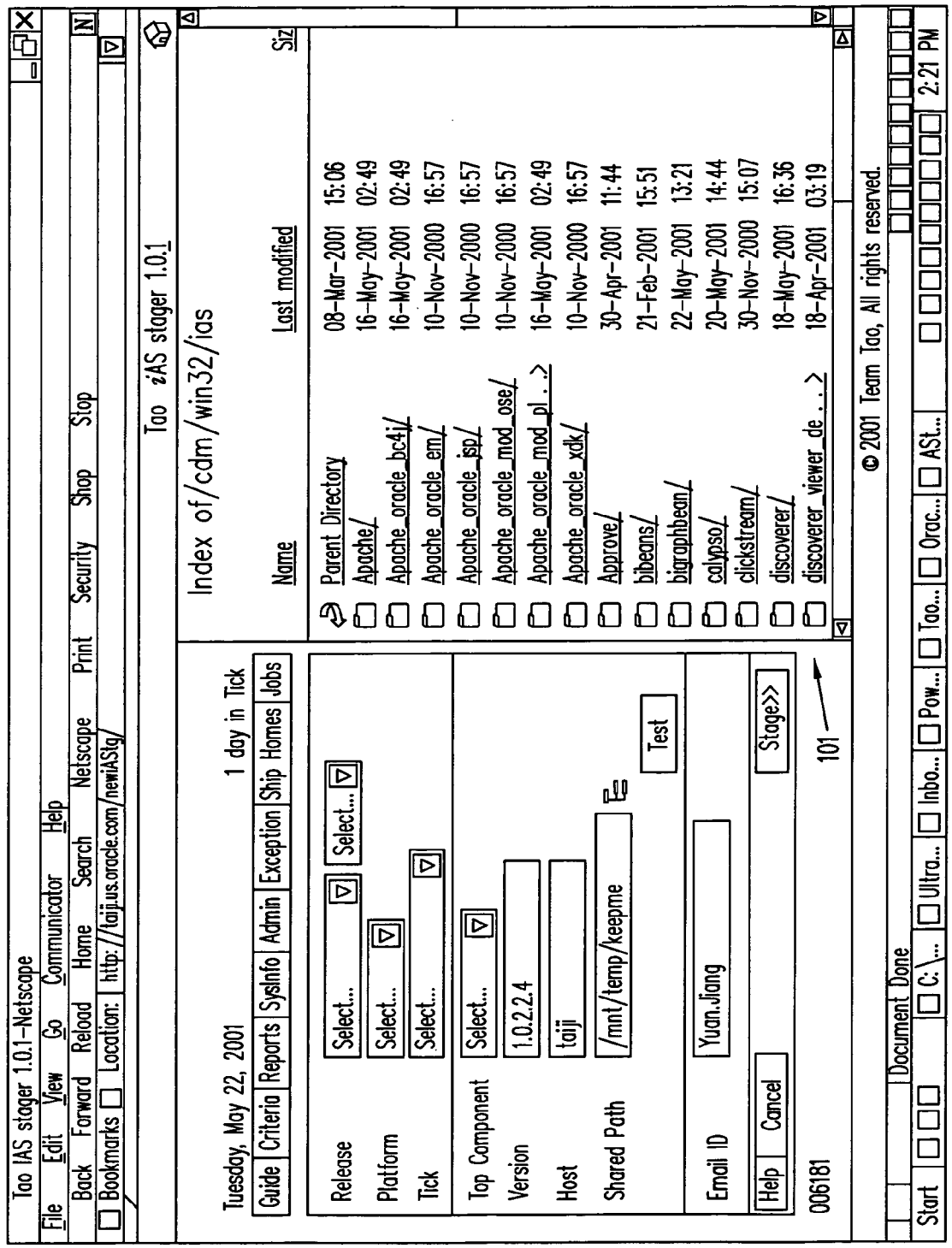
Figure 25:
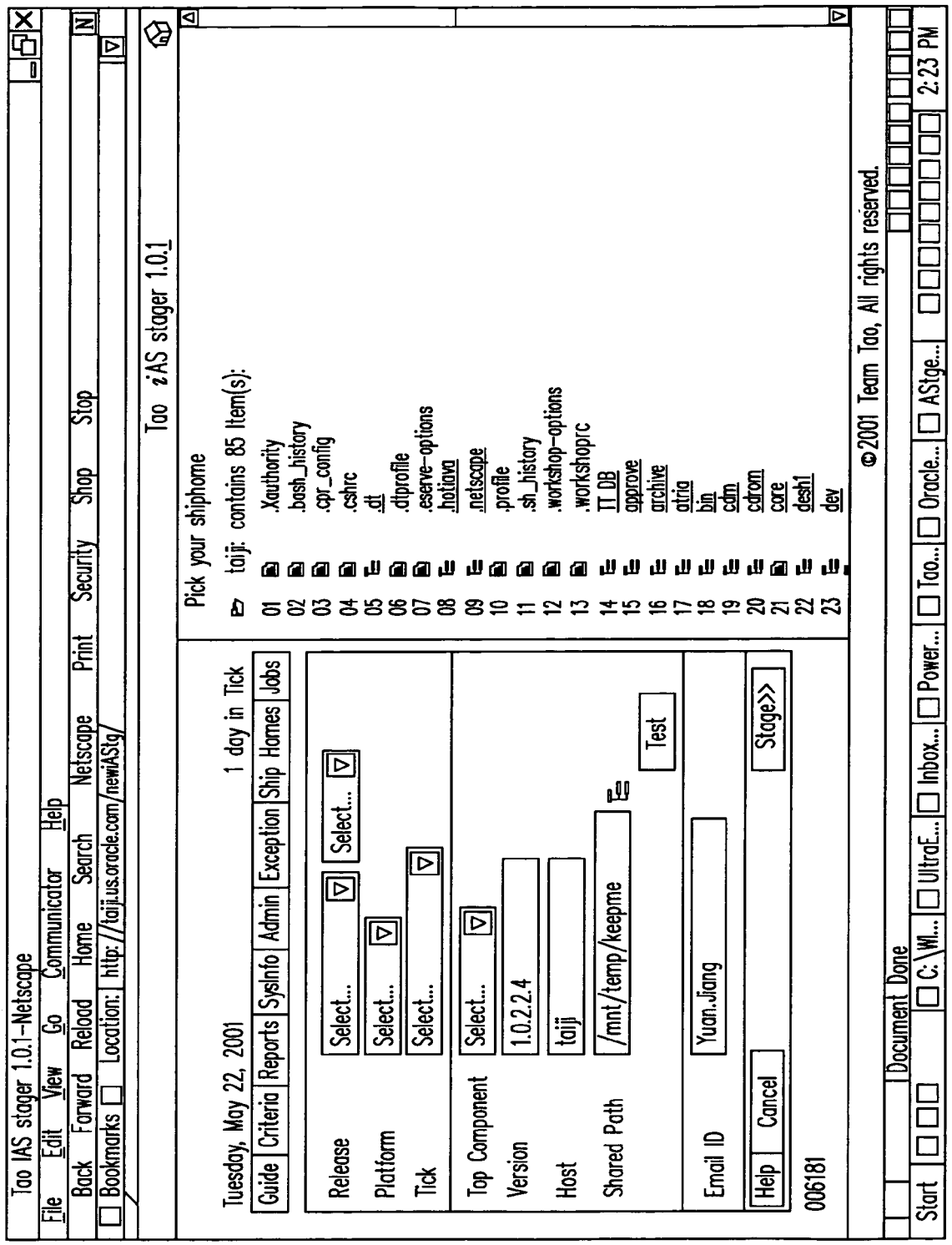

Specifically, on selection of button 33B, the graphical user interface automatically sends a message to computer 20 (FIG. 3), specifying the path. Stager 20 will check whether or not the path specified in control 33 is accessible, and that the protections specified for software resident at this path (for the version in control 32) allow stager 20 to make a copy of the software. If a specified path is incorrectly remembered by a developer, the developer can operate a button 33C (FIG. 5) which causes a display of the directory structure 10 accessible by stager 20 as illustrated in FIGS. 24 and 25, to select the software of the version to be staged.

Pseudo-code for such functionality is as follows.

```
Test:
    Ping remote host;
    If time out
    then
        alert user - host not reachable;
    else
        validate component according to Entry Criteria;
        if no error found in the previous step
        then
            display successful message;
        else
            alert user the errors;
    done
Component Selector:
    List all shared top level directories on the remote
    host;
    If nothing found
    then
        alert user - host not available or nothing shared;
    else
    loop:
        wait for user input - navigate, pickup, finished
        if user clicks "pick up" of a directory
        then
            set directory name to control 33 in FIG. 5;
            go to loop;
        else
            if user clicks "navigate" of a directory
            then
                display all subdirectories of the
        directory;
                go to loop;
                else # finished
                    done;
    done
```

Moreover, in this example, the graphical user interface also requires the developer to identify a product in control 37 (FIG. 5) that is to use the version of the software component being released. For example, a developer of the component "Apache" has specified in control 37 (FIG. 5) that the software product is "Application Server", which is abbreviated as "iAS" and is available from the assignee of the patent application, Oracle Corporation. The graphical user interface also requires the developer to identify a version number of the product (e.g. 1.0.2.2) in a control 37A, and also a platform for which the software is developed in control 37B, such as "Win 32" or "Unix". Furthermore, in this example, the graphical user interface also requires the developer to identify their email address in control 35, so that such information may be used in generating reports, for example, to identify who made a change to a particular version of the component. Once all of the information in the above-described controls 31, 32, 32A, 33, 33A, 35, 37, 37A and 37B has been provided, the developer can select another button 39 which is labeled "Stage >>".

Figure 6:
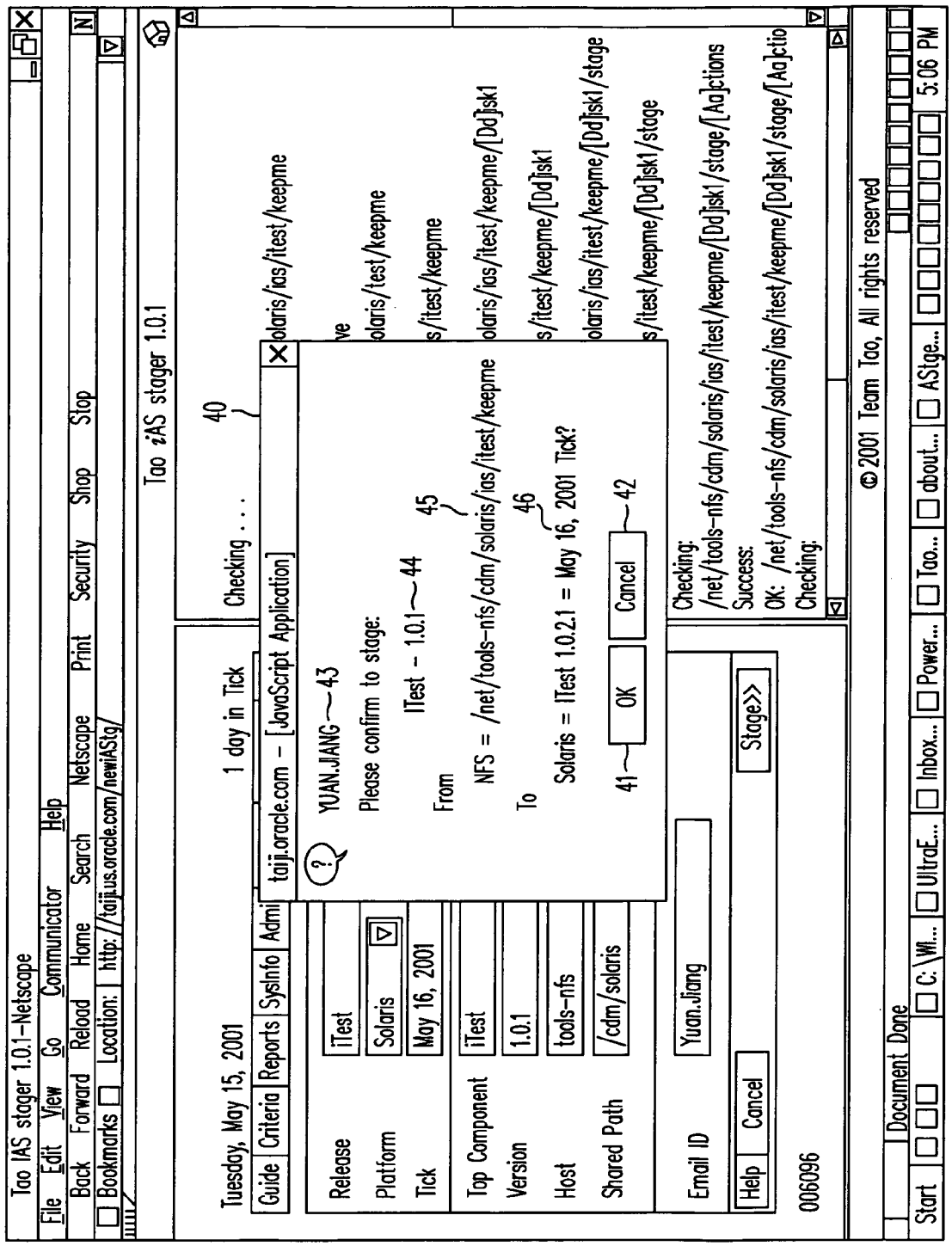

Operation of button 39 causes the information provided by the developer in screen 30 to be transmitted to stager 20 which then checks that all of the information in the just-described controls is not null and valid, and if so displays to the developer a dialog box for confirmation as illustrated in FIG. 6. So, the developer is given an opportunity to confirm the staging in dialog box 40, by operating button 41 to continue or operating button 42 to cancel from the staging process. In dialog box 40, the following information is displayed: the user's email address in field 43, the component and version in field 44, the host name and path in field 45, and the product name and product version number and tick in field 46. The display of such information in message box 40 provides a feedback to the developer, to proof the information for any mistakes.

On selection of button 41, FIG. 6, the developer's computer 21A communicates with stager 20 (FIG. 3), which in turn provides a screen 30 having two additional controls 51 and 52 (FIG. 7) for the receipt of certain additional information, such as the label of the version being staged in version control system, such as ClearCase, and labels of bugs that have been fixed in the version, as identified in a bug tracking system, such as ClearDDTS, both of which are available from Rational Software Corporation of Cupertino, Calif.

In the above-described example, the graphical user interface also displays a field 53 that contains much of the information in fields 43–46 described above in reference to FIG. 6. After the developer has provided all of the necessary information in controls 51 and 52, the developer may select a button 54 which is labeled "Continue>>". Screen 50 as a whole or portions of this screen may not be used in certain embodiments of the stager, e.g. if the version number is associated with a bug number and/or a ClearCase label elsewhere.

In response to operation of button 54, stager 20 displays another screen 60 that contains the same information 53 described above in reference to screen 50 (FIG. 7) and also describes the results of various operations being performed, such as message field 61 (FIG. 8) which state the result of checking for compatibility of the current version against various tools (such as compiler) and libraries (such as dll) that are to be used in the current release of the product.

For example, release management defines a table of versions of software that each component being released should use, and at staging time component stager 20 enforces the compatibility by extracting the version from the to-be-staged component and comparing it with the one defined by release management.

Figure 8:
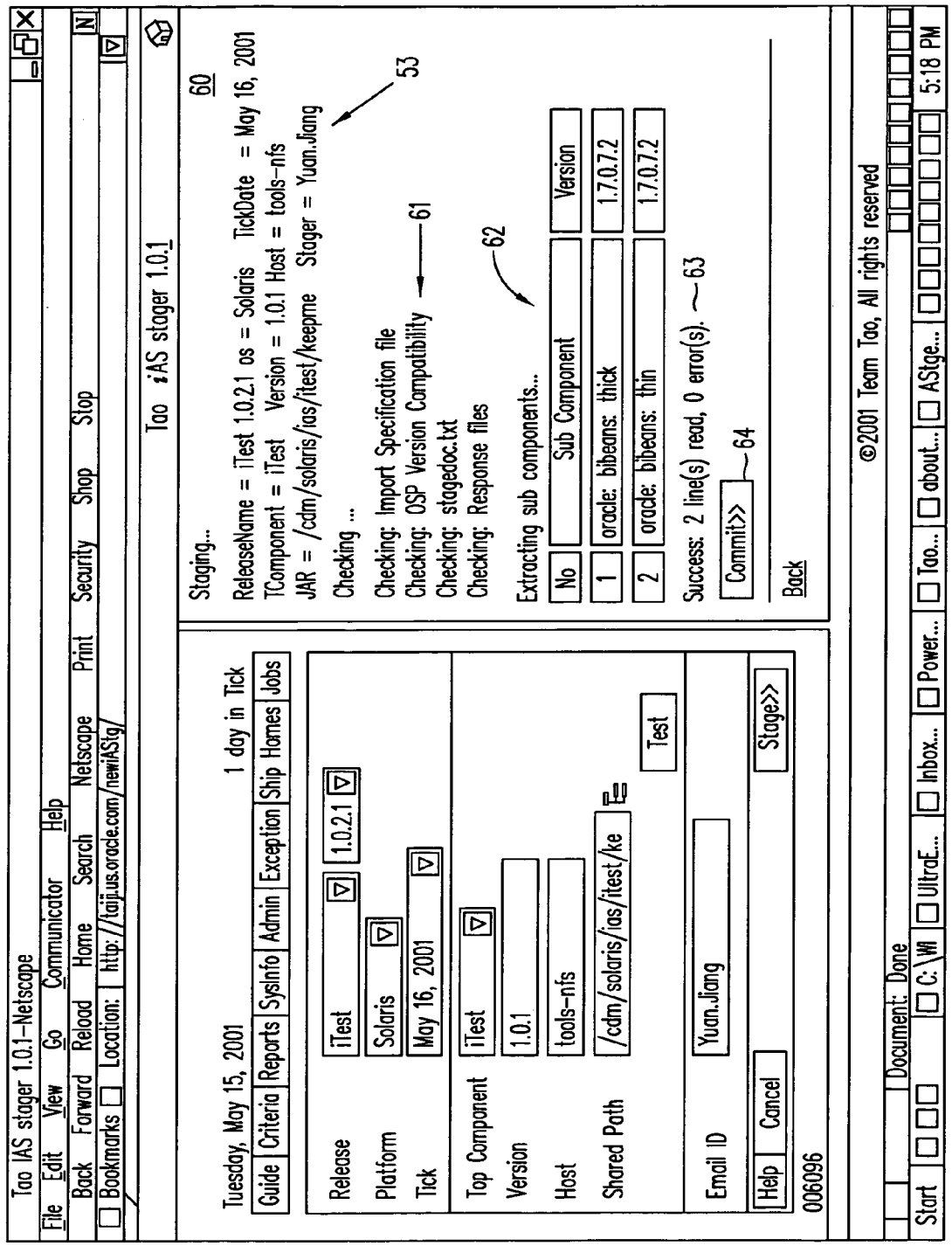

Moreover, stager 20 also extracts the subcomponents of the current version of the component, and displays the extracted information in field 62 (FIG. 8). Release computer 20 also displays a summary line 63 that identifies whether or not any errors were found in the use of various subcomponents. Such extraction of subcomponents is performed automatically in one embodiment by use of Oracle Universal Installer, although other forms of extraction of subcomponents can also be used depending on the embodiment. In an alternative embodiment, the subcomponent information is obtained from a developer, through one or more controls of the type described above, via a graphical user interface.

Instead of the Oracle Universal Installer, any verifiable standard can be used to evaluate the validity of a component stage. One of the entry criteria checks performed by one implementation of stager 20 (that is used to manage the Oracle 9iAS and iDS component-based development project) is a check of the Oracle Software Packager version. Specifically, the version of the Oracle Software Packager (OSP) used to package the component is looked up and compared against a table of acceptable values. This is done by navigating through the component's directory structure and looking for a specific filename. The filename associated with the OSP being used has an associated version number, and this is looked up against a table of valid OSP version numbers that developers are allowed to use.

Screen 60 as a whole, or portions of this screen may not be used in certain embodiments of the stager, e.g. if all developers have access to only one version of a tool and/or library.

Figure 9:

In response to the operation of button 64 (FIG. 8), stager 20 displays a screen 70 (FIG. 9) on a developer computer 21A. Screen 70 informs the developer of the number of jobs that are currently pending in a staging queue in a field 71, which is a list. Screen 70 also displays some additional information in field 72 that describes what is about to happen with the jobs in control 71. Specifically, field 71 describes the time a version was submitted (also called "staging time"), the version number, and the tick with which the version is associated, and also describes the product name and the product version number. Field 71 is automatically updated e.g. periodically or after the version has been staged (i.e. after copying of the version from computer 21A to stager 20 has been completed). In the example of FIG. 9, there will be no entries in the list in field 71 after the one and only entry has completed staging.

Although certain screens 30–70 have been illustrated in FIGS. 5–9 to provide one example of an implementation, in other implementations one or more screens may be organized differently. For example, two or more screens may be combined and/or omitted and/or split up. As noted elsewhere, additional information or less information may be elicited from a developer depending on the automation.

Figure 10:
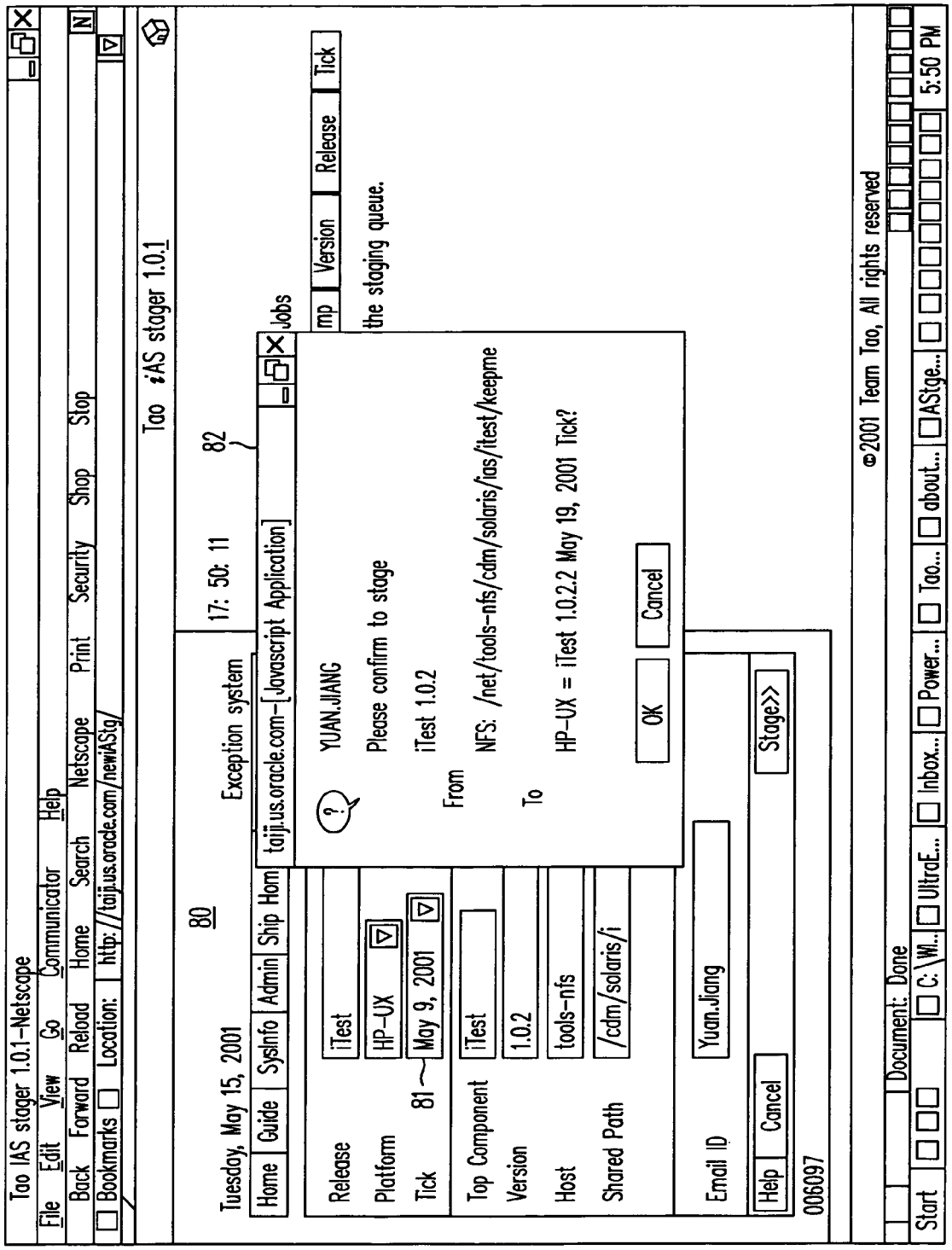

If a developer decides to associate a version of a component with a tick in the past, such an association may be performed through an "exception system" that may have other screens as illustrated by screen 80 (FIG. 10).

Specifically, in the illustrated example, the current day is May 15, 2001, and in control 81 the developer has selected a tick in the past, namely May 9, 2001. Control 81 that is used in the exception system's user interface differs from control 31 used in the normal staging's user interface as follows: control 31 only displays tick(s) later than current time, whereas control 81 displays all available ticks before current time.

A developer may go from the graphical user interface 30 (FIG. 5) to the graphical user interface 80 (FIG. 10) by use of a tab labeled "Exception" in user interface 30, and another tab labeled "Home" in user interface 80 lead the developer back to user interface 30.

Figure 7:
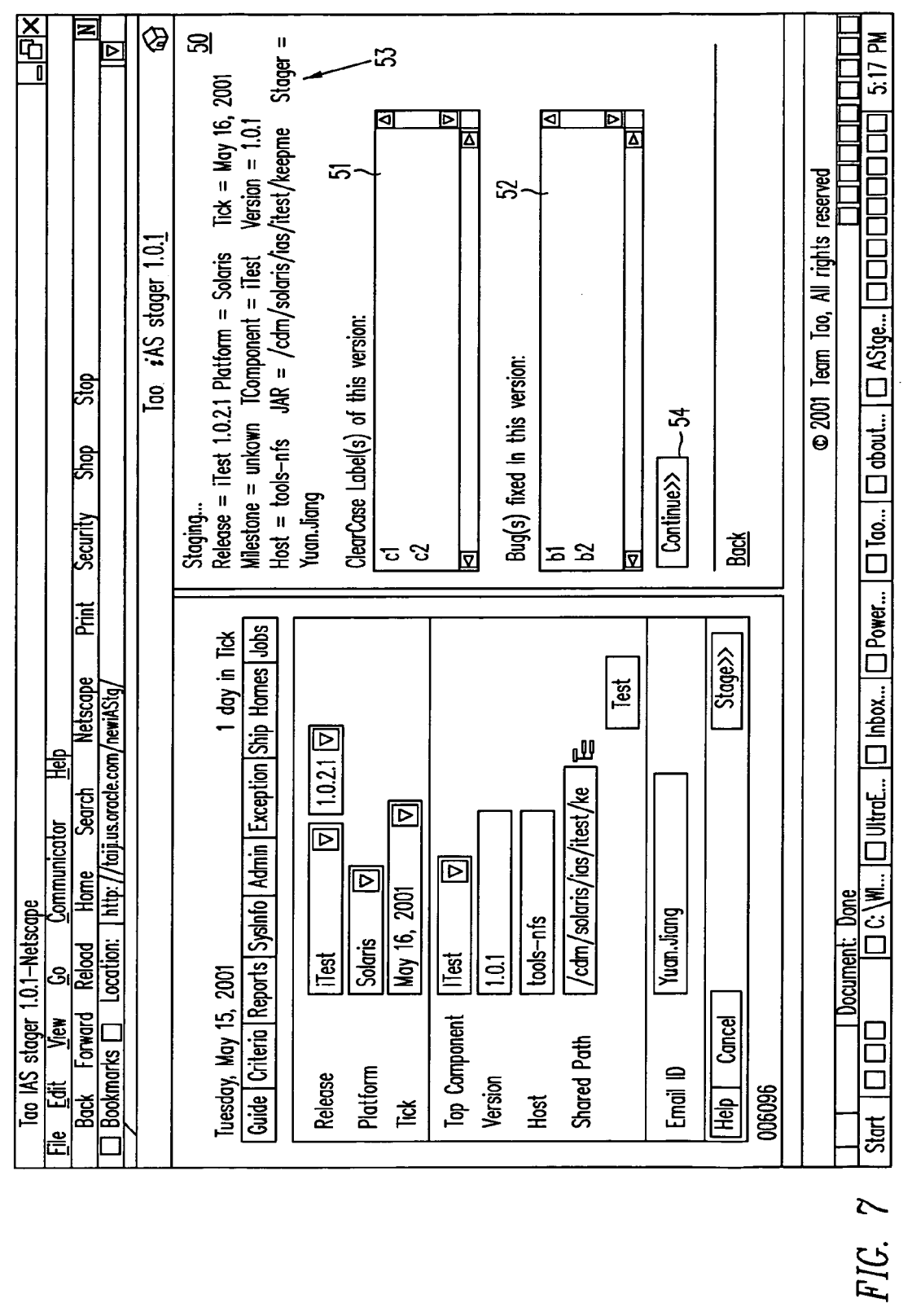
Figure 11:
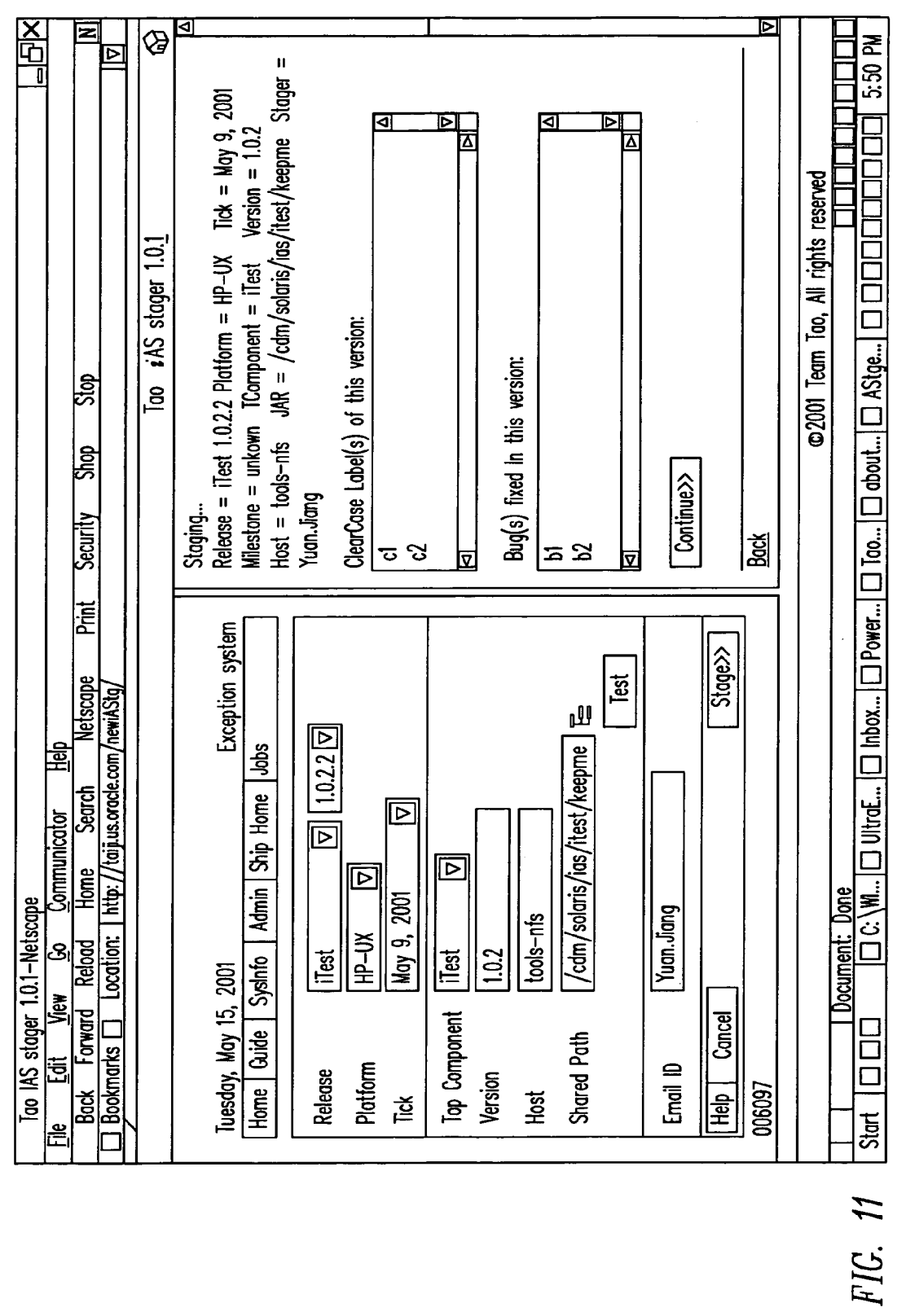
Figure 12:
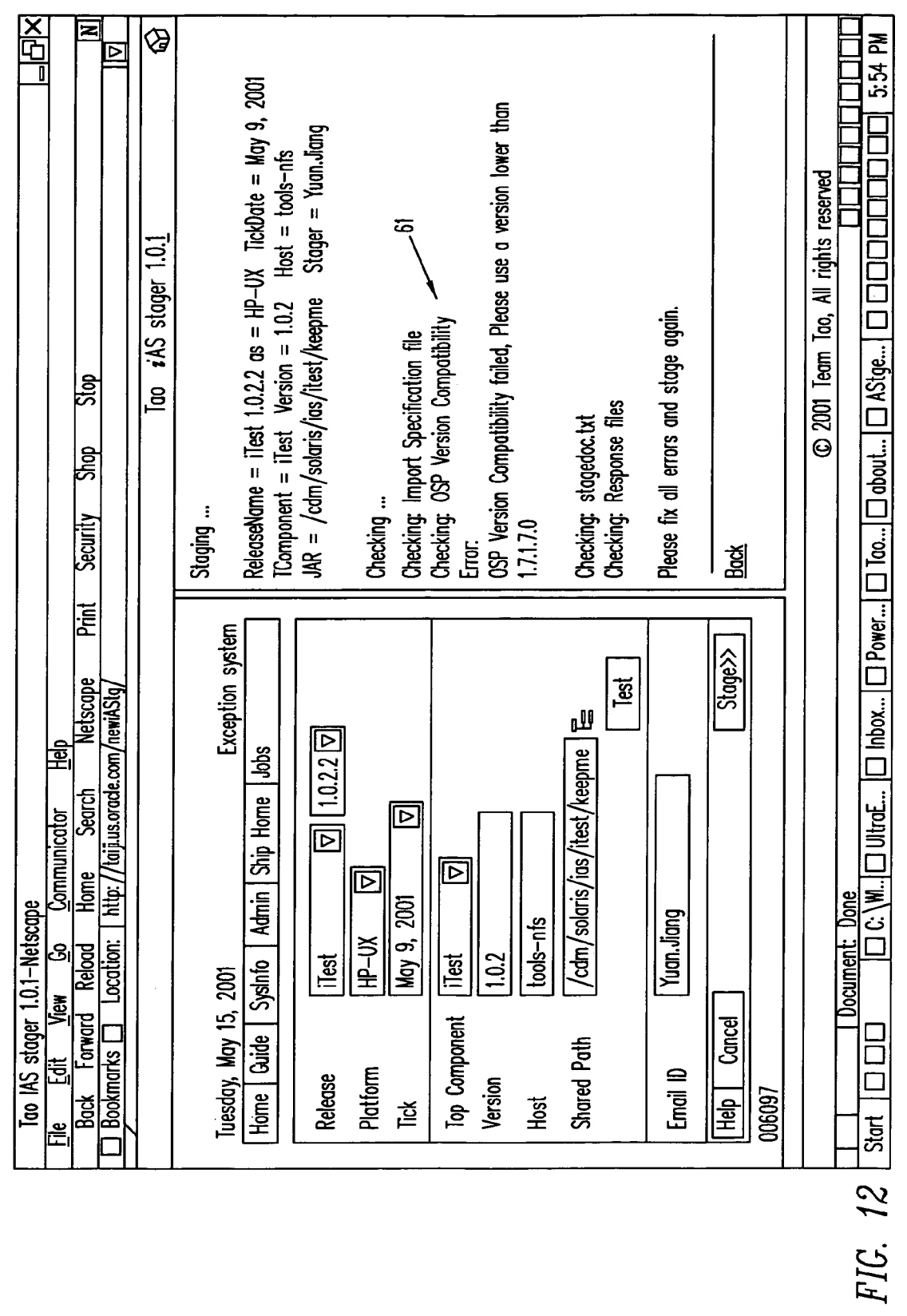
Figure 13:
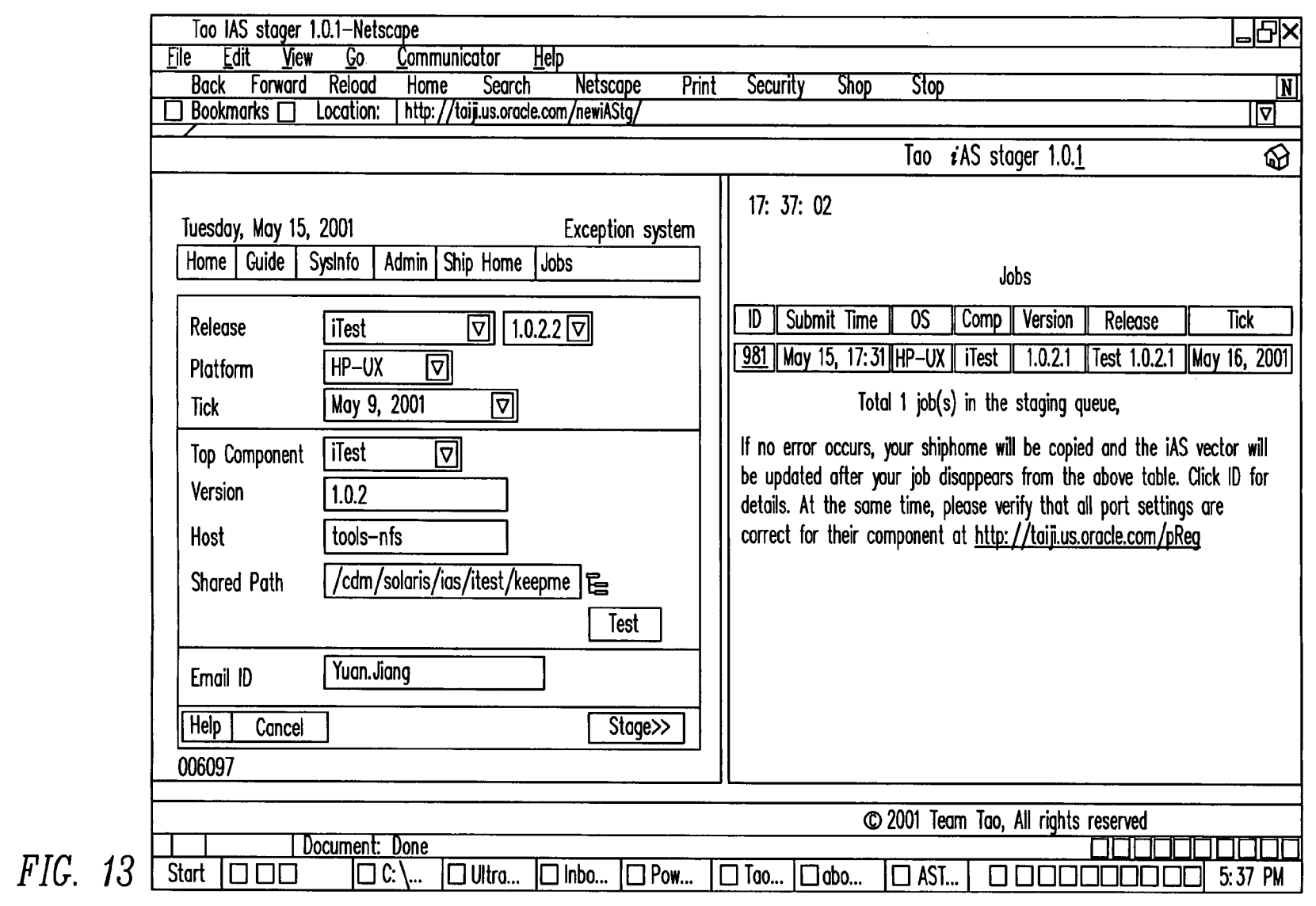

In the example illustrated in FIG. 10, a dialog box 82 is displayed to the developer to confirm that the version is to be staged to a previous tick in a manner similar to that described above in reference to dialog box 40 of FIG. 6. Moreover, the screens displayed to the developer when performing an exception staging are identical to the screens when staging a version two tick in the future, as illustrated by FIGS. 11–13. The differences between FIGS. 11–13 and the corresponding FIGS. 7–9 are "behind the scene" in terms of the operations performed by the component stager 20, as follows.

Checking:
In regular staging: tick can't be older than current time;
In exception staging: tick can't be newer than current time;
Destination:
In regular staging, stage goes to public, all related groups;
In exception staging, stage goes to release management for approval;

When processing exception staging as described above in reference to FIGS. 10–13, stager 20 performs the same actions as those described above, namely copying of the software of the current version, and in addition also performs an act of sending an email to a predetermined person (called "exception administrator"). An exception administrator can approve in screen 90 each of a number of such exceptions that may be requested by a corresponding number of developers. Screen 90 (FIG. 14) displays a list 91 of all the exception requests that are currently pending. List 91 is similar to list 71 described above in reference to FIG. 9, except that list 91 includes (in each entry of the list) two buttons 92A and 92B that may be selected by the exception administrator to either approve disapprove the exception request. Instead of having two buttons 92A and 92B for each entry, screen 90 may be designed with common buttons that apply to any entry in the list if the entry has been selected.

If the exception request is approved, then stager 20 proceeds to committing a record in a database that holds all associations between versions and ticks. As noted elsewhere, such associations may be stored in a flat file instead of a database. If the exception is disapproved (e.g. by operation of button 92B), stager 20 drops the related record from the database, and also deletes any copy of the version that has been made, and informs the developer about the rejection by sending an email.

Figure 16:
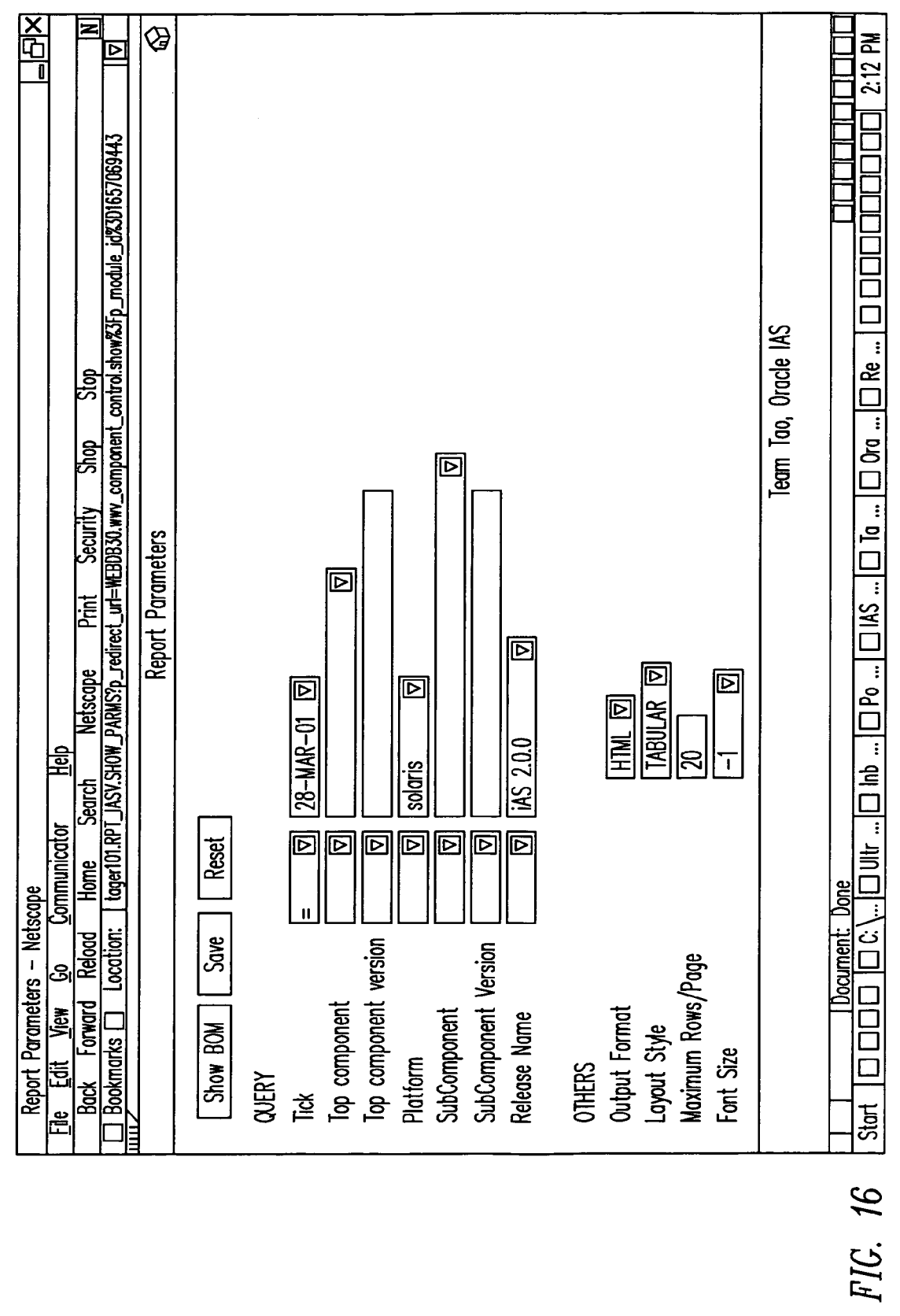

In the just-described example, stager 20 maintains a central repository in disk 20D (FIG. 3) for all of the versions that are being submitted by various developers through their respective computers 21A–21P. Moreover, in this example, stager 20 may be queried to obtain a report of a bill of materials of any given product (and for a specific version of such a product), as illustrated in FIGS. 16 and 17. Moreover, as noted above in reference to FIG. 8, an automatic dependency checking mechanism verifies that all of the versions meet certain criteria, e.g. use the same subcomponent e.g. Bali. Dependency analysis may be done by generating common dependency reports, e.g. by use of business intelligent tools like Oracle Discoverer.

Figure 14:
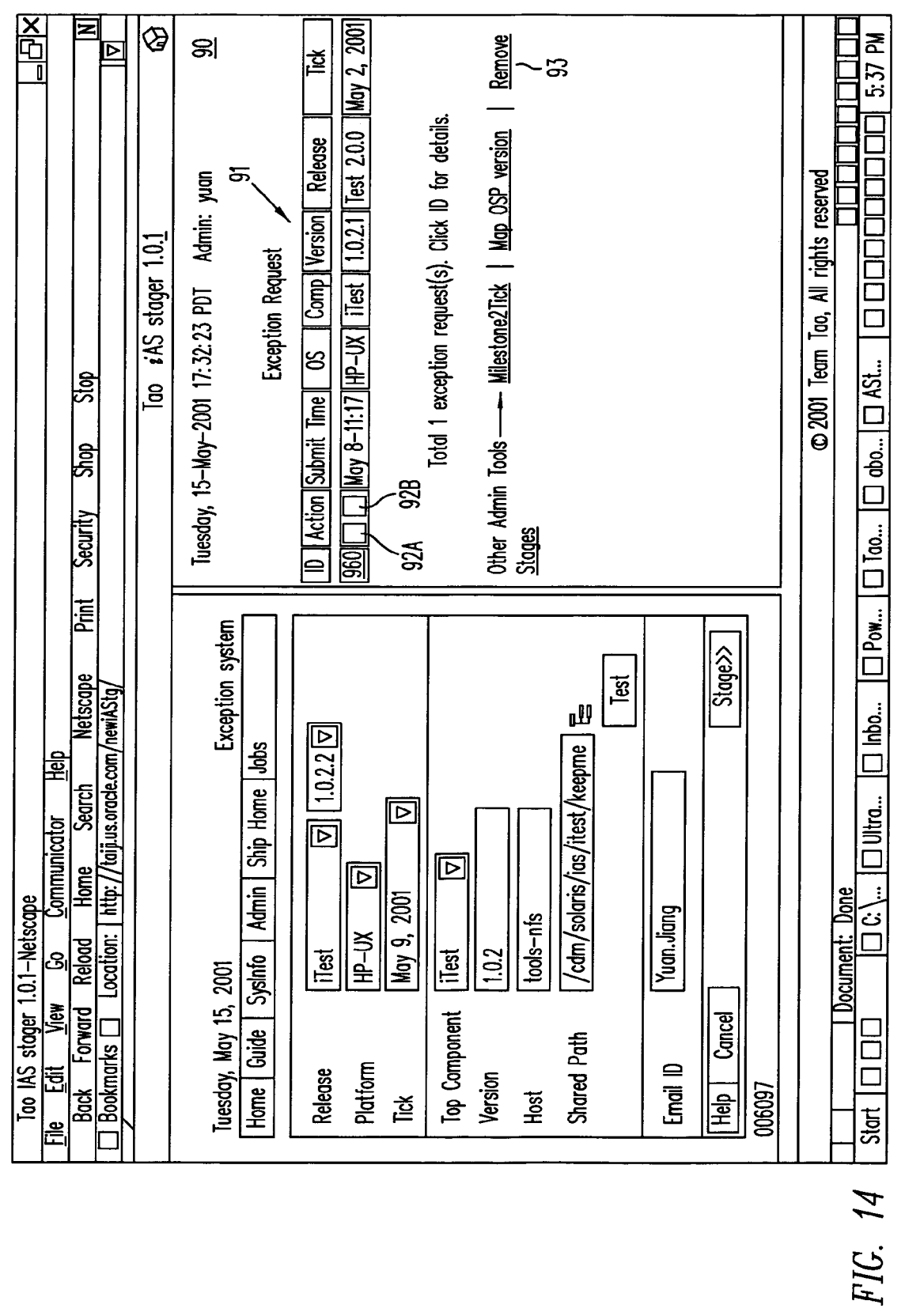

Therefore, stager 20 ensures that there are no conflicts between any of the components (e.g. due to their use of different subcomponents, compilers, or libraries). Moreover, if there is an error in the staging of one or more components as illustrated in field 61 of FIG. 12, such errors can be corrected by removing stages as illustrated by the hyperlink 93 (FIG. 14). In one implementation, when hyperlink 93 is selected, a new page is displayed to fulfill the following tasks:

Milestone2Tick: defines an association between a milestone and a tick, say Jun. 13, 2001 is Milestone 1; So developers know the deadline for a release;

Map OSP version: defines a compatibility table, which defines the version that is expected in a component for a release.

Furthermore, a database in disk 20D supports tracking of various versions that are being staged, and allows reports to be run based on various query criteria, such as who, when, what and exceptions, as illustrated in FIGS. 18–25 (described below). The database in disk 20D allows queries by tick, component, component version, platform, installable subcomponent, release return tick, release, component, installable subcomponent, subcomponent version, and platform. Furthermore, stager 20 automatically sends announcements by email to personnel that need to be informed about the staging of one or more versions of a component and/or when all of the components for a given product have been staged.

The database in disk 20D can also be queried as illustrated in FIG. 22 to generate a report as illustrated in FIG. 23 that contains the labels in the version system, such as ClearCase labels, and a list of all of the bugs that have been corrected in a given version of a component and/or a given version of a product. Such a report can be limited to just ClearCase labels or to just bug fixes, if necessary.

As noted elsewhere herein, the above-described example is implemented using a web browser for the front end. Specifically, the front tier constitutes a software client implemented in HTML, cascaded style sheets (CSS), and/or java script to provide an interaction with the developer and/or exception administrator. The front end also performs input checking which is implemented in java script and provides an on-line guide, help and support information, and also bug information. The front end also displays "vector data display" which is a bill of materials (BOM) report that is generated from the database.

An iAS server from Oracle Corporation may be used to implement the middle tier, and Oracle 8i database to implement the back end as discussed below. Specifically, the middle tier is implemented in this example using an Apache server page (SSI) script, java servlet/jsp script, Mod_plsql, Mod_perl, Oracle Portals, Oracle XDK and CGI to provide the following functionality: tick/milestone management by automatically calculating the tick and mapping the milestone. Pseudo-code for this functionality is as follows:

Tick calculating example:
Zero="Jan. 10th 2001"; # The first tick
Interval=7; # how many days in one tick
Days_passed_after_first_tick=today−Zero;
Offset=(Interval—Days_passed_after_first_tick % Interval) % Interval;
Next tick 1=today+Offset;
Next tick 2=today+offset+Internal;
So if today is Jan. 22$^{nd}$, 2001 then Days_passed_after_first_tick=22−10=12
Offset=(7−12%7)%7=2;
tick1=Jan. 22$^{nd}$ 2001+2=Jan. 24$^{th}$ 2001;
tick2=Jan. 22$^{nd}$ 2001+2+7=Jan. 31$^{st}$ 2001;
So if today is Jan. 24$^{th}$, 2001 then Days_passed_after_first_tick=24−10=14
Offset=(7−14%7)%7=0;
tick1=Jan. 24$^{th}$ 2001+0=Jan. 24$^{th}$ 2001;
tick2=Jan. 24$^{th}$ 2001+0+7=Jan. 31$^{st}$ 2001;

Dynamic configuration for centralized configuration control, release information, component information, platform information, tick information, user information, counter and time information is provided by the web server, for example Server Side Include—SSI supported by Apache, Java Server Page—JSP supported by Java. An exemplary page contains the following code:

```
Web Server Side: (mid-tier)
<html>
    <title>hello</title>
    <head>hello</head>
    <body>
        <!--#exec cmd="hello.sh" -->
    </body>
</html>
hello.sh:
    #!/bin/sh
    echo "Hello world";
```

The result html that appears in a user's browser looks like this:—that is the client side (front tier)

```
<html>
    <title>hello</title>
    <head>hello</head>
    <body>
        Hello world
    </body>
</html>
```

The middle tier also performs the testing and validating of a path provided by the developer for checking the accessibility of a version of a component that is being made available for release, and also performs remote display and pickup of the component (also called "shiphome").

Shiphome pickup is a web based tool to navigate through the file system and pick a directory from all shared directories on a remote machine. Shiphome display is used instead of asking developers to supply command line level operations, to provide a web interface for the developers to browse and view file systems on the centralized server from a web browser through a web server.

In this example, the middle tier automatically performs extraction of the subcomponents, automatic calculation of the disk space needed to be allocated to accommodate the copies of the components being released. Pseudo for this functionality follows.

```
Extraction of subcomponents:
    An OUI Oracle Universal Installer stage has the
following structure:
    1. A directory called "Disk1"
    2. Under the Disk1 directory, the following
    directories:
    Actions
    Components
    Dialogs
    Queries
    Response
        Components directory has the following structure:
        subcomponents1/version
        subcomponents2/version
        subcomponents3/version
        . . .
Automatic calculation of the disk space:
```

Suppose there are N disks on the centralized server.

```
For I from 1 to N do
    If Free space of disk I > needed space to stage
    Then
        return disk I;
End of For
Error: Alert user - no more space available on server;
```

In one embodiment, a next version number is not computed but provided by the developer. In such an embodiment, the developer may ensure that the new version number is different from the one currently existing in the database. Alternatively, versions numbers being used by a developer may be automatically checked by the middle tier against the database to ensure that the existing versions are not being staged to a new tick.

The middle tier may also perform off-line copying of the component from a remote machine to the staging server, and monitor the job status of each component being staged. Pseudo-code for the monitoring functionality follows.

```
while true do
    if the "copy" process is still there in the system
    then
        display how long the process has been running
        to user;
        sleep 1 second;
    else
        display "no job is being processed" message
        to user;
end of while;
```

The middle tier may also generate reports related to staging, may also provide automated notification of staging (e.g. by preparing and sending email messages), and may further provide tick milestone management. The tick milestone management may be implemented using a join instruction inside the database. Such a database may have a table defining all the ticks—tickno, tick, another table defining milestone—tickno, milestone. The release management joins the two tables on tickno, so milestones and ticks could be associated with each other.

Moreover, back end procedures may be written in PL/SQL to implement the commit/roll back mechanism for staging as follows.

```
Save point;
For every component in the stage do
    Insert component, version, platform, release, tick into
        the database;
End of For;
If Everything is OK with all inserts
# no invalid data, no database problem then
    commit;
else
    rollback to save point;
done.
``` back end procedures may also store the staging data, and a schedule a job to propagate the vector data from the latest tick to a newly opened tick, as follows.

```
Tick=the latest tick available from the database;
Newtick=Tick+Interval between two ticks;
(Refer to previous pseudo code on how to calculate ticks)
Save point;
Just precautious clean up:
    delete everything from the database where
        tickdate=Newtick;
    Select everything from the database where tickdate=tick
        into a temporary table TT;
    Update everything in TT with tickdate=Newtick;
    Insert everything from TT to the final database;
    If everything OK then commit else roll back to Save
        point;
Done;
```

In one example of the scheduled job, there are two ticks scheduled for June 14 and June 28 respectively. If a developer stages a version to the June 14 tick, the staging computer 20 will automatically stage the same version to the June 28 tick. If the developer stages the version to the June 28 tick, there is no staging back to June 14 tick. In addition, a scheduled job inside the database automatically propagates the vectors from the latest tick to a brand new tick at the time 00:00:00 on the new date.

In one embodiment, a list of all the fields that are present in a vector are as follows.

| Name | Null | Type |
|---|---|---|
| COMPNO | NOT NULL | NUMBER (10) |
| COMPONENT | NOT NULL | VARCHAR2 (64) |
| VERSION | NOT NULL | VARCHAR2 (36) |
| RELEASE_NAME | NOT NULL | VARCHAR2 (20) |
| PLATFORM | NOT NULL | VARCHAR2 (16) |
| TICK | NOT NULL | DATE |
| PARENT | NOT NULL | NUMBER (10) |

Note, however, that the exception vector data may or may not be propagated, depending the release management's decision. In one embodiment the exception vector data is not propagated, because the stage is treated as an exception to a closed tick or milestone. Stages to the open ticks or to future milestones should not be overwritten by the exception.

In the above-described example, a database held in disk 20D may contain, for example, the following tables in addition to the above table.

Table IASLOG

| Name | Null | Type |
|---|---|---|
| STAGE_DATE | NOT NULL | DATE |
| STAGER | NOT NULL | VARCHAR2 (40) |
| URL | NOT NULL | VARCHAR2 (80) |
| COMPNO | NOT NULL | NUMBER (10) |

Table ClearCase Label & bug list

| Name | Null | Type |
|---|---|---|
| COMPNO | | NUMBER |
| CLABEL | | VARCHAR2 (3000) |
| LABEL_TYPE | | VARCHAR2 (10) |

| Table Milestone | | |
| --- | --- | --- |
| Name | Null | Type |
| M_ID | NOT NULL | NUMBER |
| TICK | NOT NULL | DATE |
| MILESTONE | NOT NULL | VARCHAR2 (10) |
| PLATFORM | NOT NULL | VARCHAR2 (30) |
| PRODUCT | NOT NULL | VARCHAR2 (50) |
| RELEASE_VERSION | NOT NULL | VARCHAR2 (50) |
| ANNOTATION | | VARCHAR2 (200) |

Use of staging computer 20 as described above eliminates the need for a development team to communicate via email and voice mail the status of their versions to the product integration team and further eliminates the need for the product integration team to make copies of the versions from their respective sources, e.g. CD-ROMS, or version control system, or NFS partition. The above-described staging computer 20 also eliminates the need for the product integration to check for the use of different coating standards because this is done automatically.

Moreover, because the system is database driver n, a number reports are available for analysis. Staging computer 20 of one implementation automatically tracks milestones, and encapsulates a workflow for approvals of late stages into the milestones (via the exception processing as described above). Staging computer 20 can be used for very large component development projects, e.g. when there are more than 20 teams working together to develop a single product. Such teams may be part of the same organization, or they may include one or more teams from other organizations, such as value added resellers (VARs). Staging computer 20 may be made available to such VAR teams as a hosted service, e.g. to Oracle's software development partners (ISVs), if such ISVs use Oracle Universal Installer to package their Oracle extensions.

Therefore, stager 20 may be used as a tool for managing the integration of component-based development projects, whether they be software projects or otherwise. For other uses, a rules-based framework for component verification may be used so that stager 20 is not limited to the Oracle Universal Installer. So for example, a Java development project may require all components to use a certain minimal version of the JDK (Java Dev Kit), to conform to a naming standard for its jar/class files, to be certified against a number of operating system platforms etc. Components can be automatically checked by stager 20 for adherence to these standards at staging time. Such a stager 20 may be made extensible such that these rules could be defined by the users/administrators of the system to fit using any entry criteria that can be verified by programmatically analyzing the component.

Figure 18:
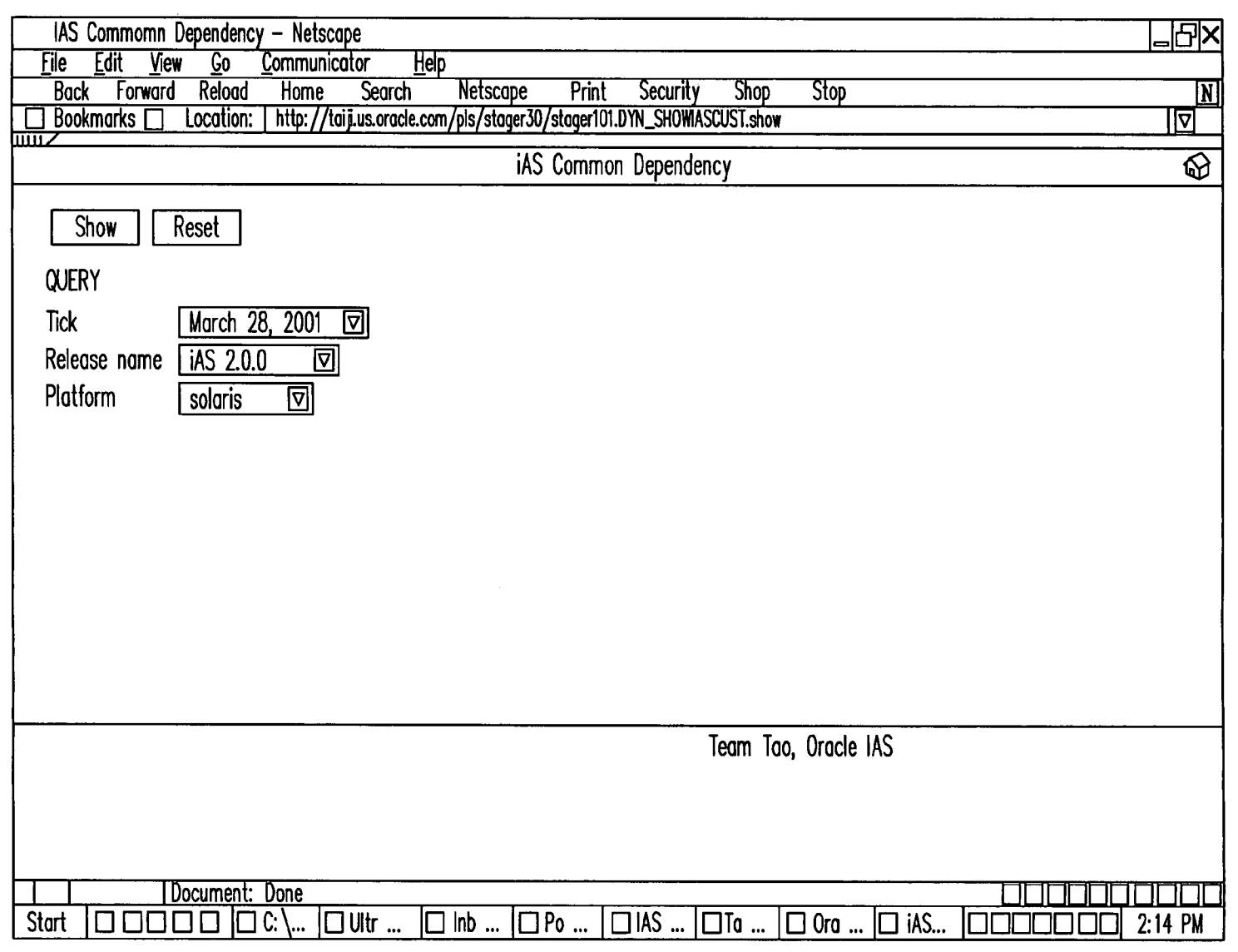

FIG. 15 illustrates a calendar which displays all future tick dates. FIGS. 16 and 17 illustrate a query based on the contents of a release, platform, tick and milestone, etc. FIGS. 18 and 19 illustrate a query on Common Dependency—Commons or conflicts, so that one can find data like the following:

```
Tick    Releaee OS component version Topcomponent
Topcomponent_Version
 . . .
14-MAR-01 iAS 2.0.0 solaris oracle.apache.jserv 1.1.2.0.0a
```

-continued

```
Apache 20-3-1.3.17.0.1a
14-MAR-01 iAS 2.0.0 solaris oracle.apache.jserv 1.1.0.0.0d
ST_Install_Team_Components 2.0.0.0.0
 . . .
```

From the above report it can be seen that "oracle.apache.jserv" is being used by two different top components (Apache and ST_) in the same release+os+tick, but they are using different versions of it.

Figure 20:
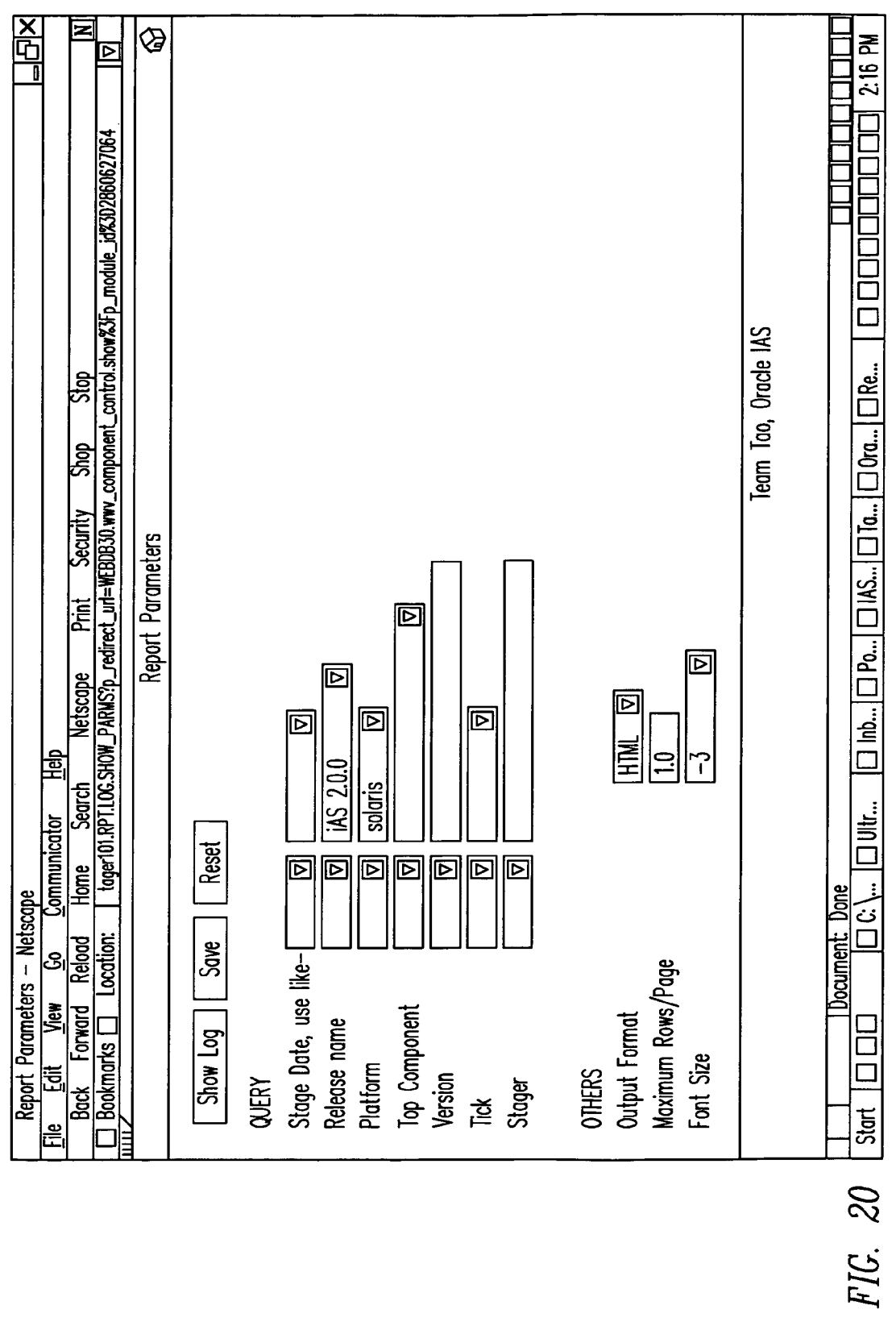

FIGS. 20 and 21 illustrate a staging history query which identifies who staged what and when. FIGS. 22 and 23 illustrate a query based on ClearCase BOM & Bug fixes—ClearCase and Bug info query. FIG. 24 illustrates a web interface for browsing shiphomes/directories on the centralized server (tools-nfs in this case). FIG. 25 illustrates the web interface for browsing and picking up directory on the remote user machine (taiji in this case).

Numerous such modifications and adaptations of the embodiments described herein will be apparent to a skilled artisan in view of the disclosure. For example, during the staging of an exception, copying of the version may be not performed prior to informing an exception administrator, and instead such copying may be done after the exception administrator approves of the exception. Copying after approval ensures that no late components are introduced into a release without the release manager's knowledge, and provides the release manager with an opportunity to analyze the impact of a late stage before it is implemented. However, when copying is implemented only after approval, the integrated release must wait for approval of the late component before the stage can be incorporated.

Numerous such modifications and adaptations of the embodiments, implementations and examples described herein are encompassed by the attached claims.

APPENDIX

```
Upon user's browser HTTP request, read configuration,
render HTML and display the regular stager's web interface
to the client browser;
    If user input of "Release, Name, Release Version,
    Platform, Tick, Top component, Version, Host, Shared Path on
    Host and Stager Email" are NOT NULL and valid
    then
        confirm user input (see FIG. 6)
        continue;
    else
        alert user
        stop;
    If the current Time on the staging servier <= user input of
    "Tick"
    then
        continue;
    else
        alert user - "Tick has been closed";
        stop;
        Display web form (see FIG. 7) asking ClearCase
            information and Bug(s) fixed in this version;
    If user input of "ClearCase Label(s) of this version and
    Bug(s) fixed in this version" are NOT NULL
    then
        continue;
    else
        alert user;
        stop;
    Validate the ship home on the remote host based on "Entry
    Criteria";
    Extract subcomponent information from the ship home based on
    Oracle Universal Installer standard (see FIG. 8);
    If no error occurred in the above two steps
```

APPENDIX-continued

```
then
   continue;
else
   alert user about the error;
   stop;
If the version of the component has NOT been staged before
then
   continue;
else
   alert user - "version must be bumped up";
   stop;
Record the staging information into the database;
Start a background process to scan virus and copy the ship
home from the remote machine to a central location (See
FIG. 9);
If no error occurred in the background process
then
   commit the staging in the database;
   send out email announcement to related people
   The following is an example of such an email:
      From: "Team Tao" <teamtao@taiji.us.oracle.com>
      To: <Yaun.Jiang@oracle.com>
      Cc: <iasptdship_us@oracle.com>;
      <iasstage_us@oracle.com>
      Sent: Friday, June 01, 2001 6:00 PM
      Subject: iAS 2.0.0:June 6, 2001:hp-ux:portal 3.0.9.8.0a
      staged
      > Friday Jun 1, 2001, 18:00:47:
      > Component: portal
      > Version: 3.0.9.8.0a
      > Platform: hp-ux
      > Release: iAS 2.0.0
      > Tick: June 6, 2001
      > Stager: Yuan.Jiang
      > Shiphome: /net/tools-nfs/cdm/hp-ux/ias/portal/3.0.9.8.0a
      > ClearCase Label(s) of hp-ux portal 3.0.9.8.0a
      > PTL_30980
      > Bug(s) fixed in hp-ux portal 3.0.9.8.0a:
      > N/A
      > Source location of hp-ux portal 3.0.9.8.0a:
      > plhpxm04 /project/iASv2/ship/portal/M6
      > Issues should be fixed:
      >
      > Warning :
      >
      > Directory ImportSpecs not found under
      /project/iASv2/ship/portal/M6/[Dd]isk1, please refer to
      sample OSP 1.7 silent import stage.
      >
      > Warning:
      >
      > stagedoc.txt not found under
      project/iASv2/ship/portal/M6. Please refer to entry
      criteria.
      >
      > Detail: http://taiji.us.oracle.com/newiAStg/
else
   drop this staging from the database;
   remove the partially staged shiphome;
   inform user about the error by Email;
   The following is an example of such an email:
      From: "Team Tao" <teamtao@taiji.us.oracle.com>
      To: <Yuan.Jiang@oracle.com>
      Cc: <Florence.Chatzigianis@oracle.com>
      Sent: Thursday, August 30, 2001 7:43 AM
      Subject: iAS staging failed.
      Thursday Aug 30, 2001, 07:42:58:
      Yuan.Jiang@oracle.com:
      Staging of discover 9.0.2.001.00m10b to hp-ux iAS 2.0.0
      August 15, 2001 tick failed
      due to the following error(s):
      cp:         cannot         open
      /net/plhpxm04.us.oracle.com/project/iASv2/ship/disco/iAS2.0-
      Disco5.0/M10b/stagedoc.txt: Permission denied
      Please correct the problem and stage again. Questions sent
      to teamtao@taiji.us.oracle.com.
      Thanks,
      Team Tao
Done.

Exception Staging:
Upon user's browser HTTP request, read configuration, render
HTML and display the exception stager's web interface to the
client browser (see FIG. 10)
If user input of "Release Name, Release Version, Platform,
Tick, Top component, Version, Host, Shared Path on Host and
Stager Email" are NOT NULL and valid
then
   confirm user input (See FIG. 10);
   continue;
else
   alert user
   stop;
   Display web form (See FIG. 11) asking for ClearCase
      information and Bug(s) fixed in this version;
If user input of "ClearCase Label(s) of this version and
Bug(s) fixed in this version" are NOT NULL
then
   continue;
else
   alert user;
   stop;
Validate the ship home on the remote host based on "Entry
Criteria";
Extract subcomponent information from the ship home based on
Oracle Universal Installer standard (See FIG. 12);
If no error occurred in the above two steps
then
   continue;
else
   alert user about the error;
   stop;
   If the version of the component has NOT been staged
before
then
   continue;
else
   alert user - "version must be bumped up";
   stop;
Record the staging information into the database (See FIG.
13);
Start a background process to scan virus and copy the ship
home from the remote machine to a central location;
If no error occurred in the background process
then
   send out email announcement to exception administers;
   The following is an example of such an email:
      From: "Team Tao" <teamtao@taiji.us.oracle.com>
      To: <Florence.Chatzigianis@oracle.com>;
      Cc: <Yuan.Jiang@oracle.com>
      Sent: Monday, June 11, 2001 7:48 PM
      Subject: Exception Request - iAS 2.0.0:June 6,
      2001:solaris:forms_reports 9.0.0.0.2
      > Monday Jun 11, 2001, 10:48:23:
      >
      > Component: forms_reports
      > Version: 9.0.0.0.2
      > Platform: solaris
      > Release: iAS 2.0.0
      > Tick: June 6, 2001
      > Requester: Yuan.Jiang@oracle.com
      >
      > ClearCase Label(s) of solaris forms_reports 9.0.0.0.2:
      >
      > element * IT_DEV_PRE_002_MAY30_2001_PROD
      > element * PL_SOLARIS_DEV_002_MAY30_2001
      >
      > Bug(s) fixed in solaris forms_reports 9.0.0.0.2:
      >
      > n/a
      >
      > Source location of solaris forms_reports 9.0.0.0.2:
      >
      > diamond.us.oracle.com /private/majain/M7/stages/stage3
      >
      >
      > Approve/Reject: http://taiji.us.oracle.com/newiAStg/admin/
else
   drop this staging from the database;
```

APPENDIX-continued

```
    remove the partially staged ship home;
    inform user about the error by Email;
    The following is an example of such an email:
        From: "Team Tao" <teamtao@taiji.us.oracle.com>
        To: <Yuan.Jiang@oracle.com>
        Cc: <Florence.Chatzigianis@oracle.com>
        Sent: Thursday, August 30, 2001 7:43 AM
        Subject: iAS staging failed.
        Thursday Aug 30, 2001, 07:42:58:
        Yuan.Jiang@oracle.com:
        Staging of discoverer 9.0.2.001.00m10b to hp-us iAS 2.0.0
        August 15, 2001 tick failed
        due to the following error(s):
        cp: cannot open
        /net/plhpxm04.us.oracle.com/project/iASv2/ship/disco/iAS2.0-
        Disco5.0/M10b/stagedoc.txt: Permission denied
        Please correct the problem and stage again. Questions sent
        to teamtao@taiji.us.oracle.com.
        Thanks,
        Team Tao
If exception administer approves the exception (See FIG.
14)
then
    commit the staging in the database;
    send out email approval announcement to related people;
    The following is an example of such an email:
        From: "Team Tao" <teamtao@taiji.us.oracle.com>
        To: <Yuan.Jiang@oracle.com>
        Cc: <iasptdship_us@oracle.com>; <iasstage_us@oracle.com>
        Sent: Tueaday, June 12, 2001 11:33 AM
        Subject: Exception - iAS 2.0.0:June 6,
        2001:solaris:forms_reports 9.0.0.0.2 approved
        > Tuesday Jun 12, 2001, 11:33:47:
        >
        > Component: form_reports
        > Version: 9.0.0.0.2
        > Platform: solaris
        > Release: iAS 2.0.0
        > Tick: June 6, 2001
        > Stager: Yuan.Jiang@oracle.com
        > Approved By: Florence
        > Shiphome: /net/tools-
        nfs/cdm/solaris/ias/forms_reports/9.0.0.0.2
        >
        > ClearCase Label(s) of solaris form_reports 9.0.0.0.2:
        >
        > element * IT_DEV_PRE_002_MAY30_2001_PROD
        > element * PL_SOLARIS_DEV_002_MAY30_ 2001
        >
        > Bug(s) fixed in solaris forms_reports 9.0.0.0.2:
        >
        > n/a
        >
        > Source location of solaris forms_reports 9.0.0.0.2:
        >
        > diamond.us.oracle.com /private/majain/M7/stages/stage3
        >
        > Issues to be fixed:
        >
        > Warning :
        >
        > Directory ImportSpecs not found under
        /private/majain/M7/stages/stage3/[Dd]isk1, please refer to
        Sample OSP 1.7 Silent import stage file.
        >
        > Warning:
        >
        > stagedoc.txt not found under
        /private/majain/M7/stages/stage3. Please refer to Entry
        criteria.
        >
        >
        > Detail: http://taiji.us.oracle.com/newiAStg/
    else
        drop this staging from the database;
        remove the staged ship home;
        inform user about the reject by Email;
        The following is an example of such an email:
            From: "Team Tao" <teamtao@taiji.us.oracle.com>
```

APPENDIX-continued

```
            To: <Yuan.Jiang@oracle.com>
            Cc: <Florence.Chatzigianis@oracle.com>
            Sent: Thursday, August 23, 2001 7:49 PM
            Subject: Exception Rejected by Florence
            Tuesday Aug 23, 2001, 18:49:25:
            Yuan.Jiang:
            win32 forms_reports 9.0.0.0.2 was rejected by Florence for
            iAS 2.0.0 August 22, 2001 tick.
        Done.
```

The invention claimed is:

1. A computer-implemented method for releasing a product under development, the method comprising:
storing in a computer memory a first association between a first version of a component of the product and a first time in future selected from a plurality of times that are to occur in future;
wherein each time in said plurality of times from has a fixed relationship to another time in said plurality of times;
wherein the first version is not to be released until the first time in future;
storing in said computer memory a second association between a second version of the component and a second time selected from said plurality of times;
subsequent to passage of at least one of said first time and said second time, identifying one of said versions as a release version, by using said associations from said computer memory and depending on whichever one of said first time and said second time occurred most recently in the past relative to current time; and
performing a build comprising at least said release version of said component.

2. The method of claim 1 wherein:
the release version is different from the second version if the second time is yet to occur.

3. The method of claim 1 wherein:
the release version is the first version if the first time occurred most recently in the past, from among said plurality of times.

4. The method of claim 1 further comprising:
on passage of said first time, automatically storing in memory another association, of said first version with a third time in future that is scheduled to occur immediately after said first time, among the plurality of times.

5. The method of claim 1 wherein the association is stored in a record of a database.

6. The method of claim 1 further comprising:
storing an identity of a person responsible for development of each version.

7. The method of claim 1 wherein the component comprises software, the method further comprising:
storing an address of each version.

8. The method of claim 1 wherein the component comprises software, the method further comprising:
copying the software to a central location of storage of other components.

9. The method of claim 1 further comprising:
storing an identity of a bug that has been fixed in each version.

10. The method of claim 1 further comprising:
storing a label of the component used in a version control system.

11. The method of claim 1 further comprising:
storing an indicator of when the first version is associated with the first time.

12. The method of claim 1 further comprising:
storing for the first version an identity of a release of all components in which the first version is to be included.

13. The method of claim 12 wherein:
the release is predetermined to occur subsequent to one of the plurality of times selected to be a milestone time.

14. The method of claim 13 wherein:
said first time is one of a group of times in said plurality, prior to said milestone time.

15. The method of claim 1 further comprising:
receiving said first time and an identification of said first version via a graphical user interface.

16. The method of claim 1 further comprising:
storing an association of a unique identifier with the first version.

17. The method of claim 16 further comprising:
receiving the unique identifier from a person responsible for development of the first version.

18. The method of claim 1 wherein:
said plurality of times comprises at least one time during each week.

19. The method of claim 18 wherein:
each time in the plurality of times occurs on a predetermined day selected from a group consisting of Tuesday, Wednesday and Thursday.

20. The method of claim 18 wherein:
each time in the plurality of times occurs on Wednesday.

21. The method of claim 1 wherein:
after the second time has occurred, said second version is identified as the release version.

22. The method of claim 21 further comprising:
storing a third association of a first identifier with the first version; and
storing a fourth association of a second identifier with the second version.

23. The method of claim 21 wherein:
said storing of second association is performed prior to said second time.

24. The method of claim 21 wherein:
said storing of second association is performed subsequent to said second time only as an exception.

25. The method of claim 1 wherein:
the fixed relationship is periodic and each time is separated from another time by a common period.

26. A computer programmed to track each component of a product under development, the computer comprising:
memory holding a first version of a component and a first time that is one of a plurality of times that are to occur in future, at memory locations addressed by a data structure;
wherein each time in said plurality of times has a fixed relationship to another time in said plurality of times;
first means for determining from current time, a second time that occurred most recently in the past, from among the plurality of times; and
second means coupled to the first means to receive therefrom the second time and coupled to the memory to receive therefrom data addressed by the data structure, the second means identifying the first version as being available for release if the first time matches the second time.

27. The computer programmed as in claim 26 wherein:
said memory also holds an identity of a person responsible for development of said first version, an address of the first version, an identity of a bug that has been fixed in the first version, a label of the component used in a version control system for the first version, an indicator of when the first version is associated with the first time, and an identity of a release of all components in which the first version is to be included.

28. The computer of claim 26 wherein:
the fixed relationship is periodic and each time is separated from another time by a common period.

* * * * *

UNITED STATES PATENT AND TRADEMARK OFFICE
CERTIFICATE OF CORRECTION

PATENT NO. : 7,093,232 B1  
APPLICATION NO. : 09/982562  
DATED : August 15, 2005  
INVENTOR(S) : Florence Chatzigianis et al.

Page 1 of 1

It is certified that error appears in the above-identified patent and that said Letters Patent is hereby corrected as shown below:

<u>Claim 1, Col. 22, Line 20</u>

Delete --from--.

Signed and Sealed this

Twenty-ninth Day of April, 2008

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,093,232 B1 | Page 1 of 1 |
| APPLICATION NO. | : 09/982562 | |
| DATED | : August 15, 2006 | |
| INVENTOR(S) | : Florence Chatzigianis et al. | |

It is certified that error appears in the above-identified patent and that said Letters Patent is hereby corrected as shown below:

Claim 1, Col. 22, Line 20

Delete --from--.

This certificate supersedes the Certificate of Correction issued April 29, 2008.

Signed and Sealed this

Twentieth Day of May, 2008

JON W. DUDAS
*Director of the United States Patent and Trademark Office*